(12) United States Patent
Goden

(10) Patent No.: US 6,900,924 B2
(45) Date of Patent: May 31, 2005

(54) DRIVING METHOD OF ELECTROPHORETIC DISPLAY

(75) Inventor: Tatsuhito Goden, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/756,116

(22) Filed: Jan. 12, 2004

(65) Prior Publication Data

US 2004/0184136 A1 Sep. 23, 2004

(30) Foreign Application Priority Data

Jan. 16, 2003 (JP) .......................................... 2003-008738
Jan. 29, 2003 (JP) .......................................... 2003-021006

(51) Int. Cl.[7] ............................ G02B 26/00; G09G 3/34
(52) U.S. Cl. ........................................ 359/296; 345/107
(58) Field of Search ................................. 359/296, 240, 359/241, 242; 345/107, 84

(56) References Cited

U.S. PATENT DOCUMENTS

| | | | | |
|---|---|---|---|---|
| 6,535,326 | B2 * | 3/2003 | Uno ............................ | 359/296 |
| 2001/0030639 | A1 | 10/2001 | Goden ......................... | 345/107 |
| 2002/0021483 | A1 | 2/2002 | Katase ........................ | 359/267 |
| 2002/0135861 | A1 | 9/2002 | Nakao et al. ............... | 359/296 |
| 2003/0117016 | A1 * | 6/2003 | Ukigaya ....................... | 305/107 |

FOREIGN PATENT DOCUMENTS

| WO | WO 03/038512 | 5/2003 |
|---|---|---|

OTHER PUBLICATIONS

E. Kishi, Y. Matsuda, Y. Uno, A. Ogawa, T. Goden, N. Ukigaya, M. Nakanishi, T. Ikeda, H. Matsuda and K. Eguchi, XP-001086658, "5.1: Development of In-Pane EPD", 2000, SID International Symposium Digest of Technical Papers, Long Beach, CA, vol. 31, pp. 24–27.

PCT Notification of Transmittal of The International Search Report and the Written Opinion of the International Searching Authority, or the Declaration, dated May 14, 2004.

* cited by examiner

Primary Examiner—Hung Xuan Dang
Assistant Examiner—Tuyen Tra
(74) Attorney, Agent, or Firm—Morgan & Finnegan, LLP

(57) ABSTRACT

An electrophoretic display includes a display substrate and a rear substrate; an insulating liquid and a plurality of electrophoretic particles; a first electrode disposed along the rear substrate for each pixel; a second electrode and a third electrode which are disposed at a boundary between adjacent pixels; voltage application means for applying voltages to the first to third electrodes, the voltage application means including reset means for collecting the electrophoretic particles at a peripheral portion of an associated pixel, writing means for moving the electrophoretic particles, and write limiting means for collecting a part of the electrophoretic particles; and control means for controlling a gradation level by adjusting timing of application of the voltage for attracting the electrophoretic particles toward the first electrode by the writing means and the voltage for attracting the electrophoretic particles toward the third electrode by the write limiting means.

15 Claims, 20 Drawing Sheets

(a) FIELD 1

| Vb | Va | Va | Va | Va |
|----|----|----|----|----|
| Va | Vb | Va | Va | Va |
| Va | Va | Vb | Va | Va |
| Va | Va | Va | Vb | Va |
| Va | Va | Va | Va | Vb |

(b) FIELD 2

| Vb | Vb | Va | Va | Va |
|----|----|----|----|----|
| Vb | Vb | Va | Va | Va |
| Va | Va | Vb | Va | Va |
| Va | Va | Va | Vb | Vb |
| Va | Va | Vb | Vb | Vb |

(c) FIELD 3

| Vb | Vb | Vb | Va | Va |
|----|----|----|----|----|
| Vb | Vb | Vb | Va | Va |
| Va | Vb | Vb | Vb | Vb |
| Va | Va | Va | Vb | Vb |
| Va | Va | Vb | Vb | Vb |

(d) FIELD 4

| Vb | Vb | Vb | Vb | Va |
|----|----|----|----|----|
| Vb | Vb | Vb | Vb | Va |
| Vb | Vb | Vb | Vb | Vb |
| Va | Vb | Va | Vb | Vb |
| Va | Vb | Vb | Vb | Vb |

FIG.8

DRIVING METHOD OF ELECTROPHORETIC DISPLAY

FIELD OF THE INVENTION AND RELATED ART

The present invention relates to a driving method of an electrophoretic display which effects display on the basis of movement of electrophoretic particles.

In recent years, an electrophoretic display of the type wherein electrophoretic particles are moved by applying an electric field thereto to effect display has received attention as a non-light emission type display device.

The electrophoretic display includes a pair of substrates disposed with a predetermined spacing therebetween, an insulating liquid filled in the spacing, a large number of electrophoretic particles dispersed in the insulating liquid, and a pair of electrodes disposed close to the insulating liquid and is designed so that the electrophoretic particles can be moved in an arbitrary direction by applying a voltage to the electrodes. Further, by changing a position of the electrophoretic particles, a display color is changed pixel by pixel to display an image over the entire apparatus.

In the case where a gradation display is effected in such an electrophoretic display, halftone images are displayed by controlling electrophoretic particles attracted to an electrode by voltage application thereby to change a dispersion state of the electrophoretic particles (e.g., as described in Japanese Laid-Open Patent Application (JP-A) 2002-116733 and JP-A 2002-116734).

However, in such a conventional electrophoretic display, a part of the electrophoretic particles is suspended in the insulating liquid in the gradation display state, so that it is difficult for the electrophoretic particles to stay in the same place for a long time. As a result, a display state (display gradation level) has been changed with time in some cases.

Further, in the case where a still image is disposed by using an electrophoretic display of an active matrix type (i.e., such a type wherein a switching device 10 is connected to an electrode at each pixel as shown in FIGS. 4 and 5), when a voltage is continually applied after image formation, the electrophoretic particles are moved to change a resultant image. In order to solve such a problem, even if a non-electric field state is intended to be created within each pixel by terminating the voltage application, the electrophoretic particles are moved in some cases by a residual electric field created by electric charges remaining in an auxiliary capacitor at each pixel. As a result, it has been difficult to display a stable still image.

SUMMARY OF THE INVENTION

Accordingly, an object of the present invention is to provide an electrophoretic display capable of reducing a change in display gradation level.

Another object of the present invention is to provide a driving method of the electrophoretic display.

According to the present invention, there is provided an electrophoretic display, comprising:

a display substrate and a rear substrate disposed with a predetermined spacing therebetween, an insulating liquid and a plurality of electrophoretic particles provided in the predetermined spacing, a first electrode disposed along the rear substrate for each pixel, a second electrode and a third electrode which are disposed at a boundary between adjacent pixels, voltage application means for applying voltages to the first to third electrodes, the voltage application means including reset means for collecting the electrophoretic particles at a peripheral portion of an associated pixel by applying a voltage for attracting the electrophoretic particles toward the second electrode, writing means for moving the electrophoretic particles collected by the reset means in a pixel area along the rear substrate by applying a voltage for attracting the electrophoretic particles toward the first electrode, and write limiting means for collecting a part of the electrophoretic particles at a peripheral portion of the associated pixel different from that with respect to the reset means by applying a voltage for attracting the electrophoretic particles toward the third electrode, and control means for controlling a gradation level by adjusting timing of application of the voltage for attracting the electrophoretic particles toward the first electrode by the writing means and the voltage for attracting the electrophoretic particles toward the third electrode by the write limiting means.

According to the present invention, there is also provided a driving method of an electrophoretic display including a display substrate and a rear substrate disposed with a predetermined spacing therebetween, an insulating liquid and a plurality of electrophoretic particles provided in the predetermined spacing, a first electrode disposed along the rear substrate for each pixel, and a second electrode and a third electrode which are disposed at a boundary between adjacent pixels, the driving method comprising:

a reset step for collecting the electrophoretic particles at a peripheral portion of an associated pixel by applying a voltage for attracting the electrophoretic particles toward the second electrode, a writing step for moving the electrophoretic particles collected by the reset means in a pixel area along the rear substrate by applying a voltage for attracting the electrophoretic particles toward the first electrode, and a write limiting step for collecting a part of the electrophoretic particles at a peripheral portion of the associated pixel different from that with respect to the rest means by applying a voltage for attracting the electrophoretic particles toward the third electrode, and wherein a gradation level is controlled by adjusting timing of application of the voltage for attracting the electrophoretic particles toward the first electrode by the writing step and the voltage for attracting the electrophoretic particles toward the third electrode by the write limiting step.

More specifically, in the reset step, the electrophoretic particles are attracted and collected in a relatively small area at each pixel to be less visually identified, and in the writing step, the electrophoretic particles are attracted and collected in a relatively large area at each pixel to be readily visually identified. Further, by switching a voltage of the third electrode, the electrophoretic particles located in the vicinity of the second electrode are attracted toward the third electrode to limit an amount of movement of the electrophoretic particles to the first electrode, and at the same time, by controlling a difference in voltage switching timing between the first electrode and the third electrode, a display gradation level at each pixel is controlled.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7(a) to (e) are schematic view showing voltage switching timing of a first electrode at the time of writing operation (writing step).

FIGS. 8(a) to (d) are schematic views showing an applied voltage at each pixel at the time of writing operation (writing step).

DETAILED DESCRIPTION OF THE PREFERRED EMBODIMENTS

Figure 1:
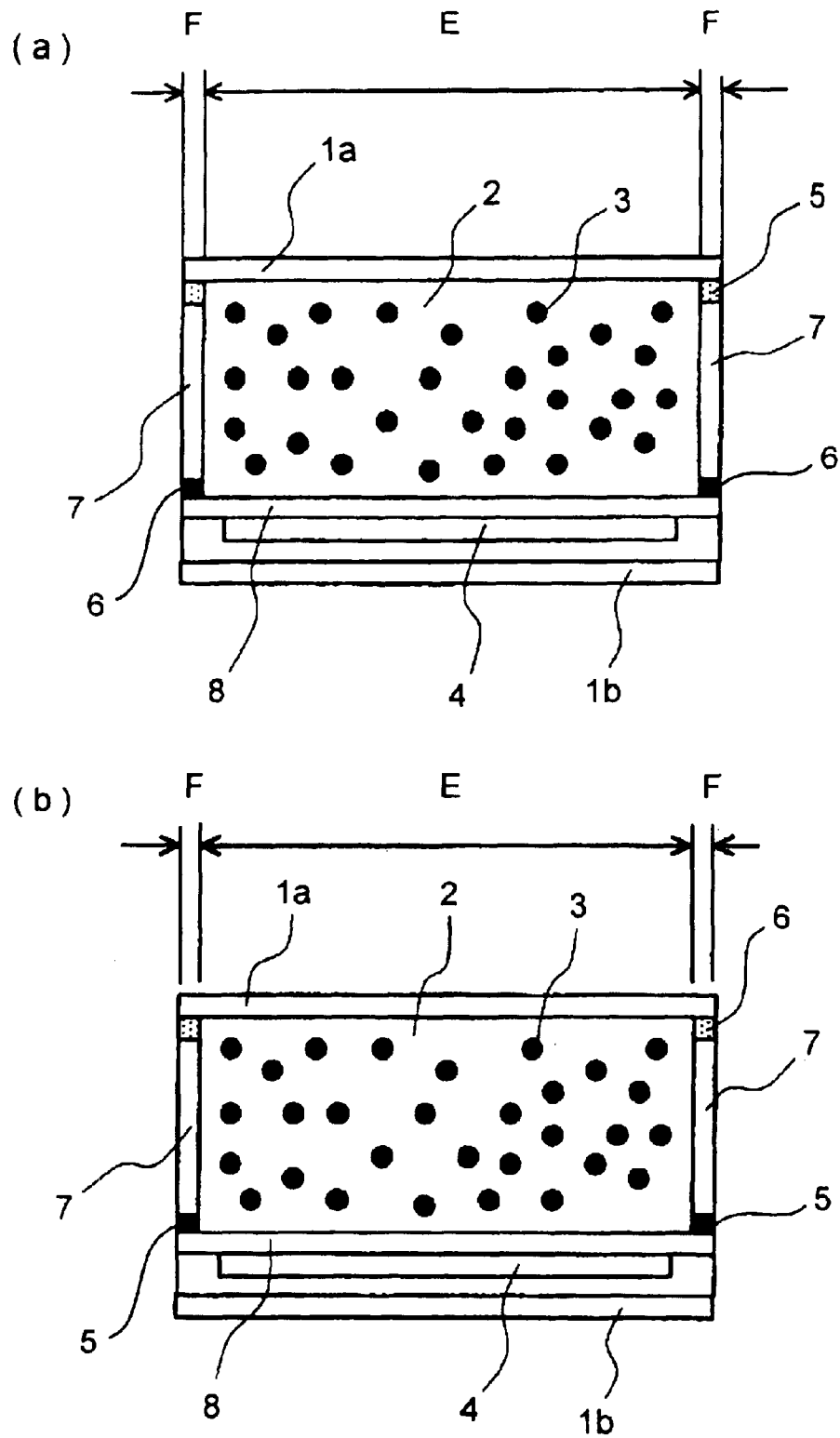
FIGS. 1(a) and (b) are respectively a sectional view showing an embodiment of a structure of the electrophoretic display according to the present invention.

Hereinafter, embodiments for carrying out the present invention will be described with reference to FIGS. 1–15.

As shown in FIGS. 1(a) and 1(b), the electrophoretic display according to the present invention includes a pair of a display substrate 1a and a rear substrate 1b disposed with a predetermined spacing therebetween, and an insulating liquid 2 and a plurality of charged migration particles (electrophoretic particles) 3 which are provided in the spacing, and is designed to effect display based on movement of the electrophoretic particles under application of an electric field.

This electrophoretic display further includes first to third electrodes 4, 5 and 6 which are disposed at each pixel E so as to come close to the insulating liquid 2. Each of the first to third electrodes is capable of attracting the electrophoretic particles 3 under application of a predetermined voltage. In the electrophoretic display, however, when the electrophoretic particles 3 are attracted to the first electrode 4, the electrophoretic particles 3 are dispersed over a relatively large area at each pixel so as to be readily recognized as shown in FIG. 14(b). On the other hand, when the electrophoretic particles 3 are attracted to the second electrode 5 or the third electrode 6, the electrophoretic particles 3 are accumulated in a relatively small area at each pixel so as to be less recognized as shown in FIG. 14(a).

In the present invention, the terms "relatively large area" and "relatively small area" are used with respect to a planar area along the substrate 1a or 1b. The display substrate 1a means a substrate which is disposed on the side from which a display state is viewed, and the rear substrate 1b means a substrate which is disposed on the backside of the electrophoretic display.

In the case where the electrophoretic display is viewed from the display substrate 1a side, the color of the electrophoretic particles 3 is visually identified as a color of pixel when the electrophoretic particles 3 are provided in the relatively large area (FIG. 14(b)). On the other hand, when the electrophoretic particles 3 are collected in the relatively small area, (the electrophoretic particles 3 are less recognizable but) the color of an area where the first electrode 4 is disposed (hereinafter, referred to as a "first electrode area") is visually identified as a color of pixel. The electrophoretic display of the present invention effects display by utilizing such a phenomenon in principle.

In order to dispose the electrophoretic particles 3 in the relatively large area at each pixel when the electrophoretic particles 3 are attracted to the first electrode 4, the first electrode 4 may preferably be disposed in a large area along the rear substrate 1b. Further, in order to collect the electrophoretic particles 3 in the relatively small area at each pixel when the electrophoretic particles 3 are attracted to the second electrode 5, the second electrode 5 may preferably disposed at a boundary portion F between adjacent pixels E.

Further, in order to collect the electrophoretic particles 3 in the relatively small area at each pixel when the electrophoretic particles 3 are attracted to the third electrode 6, the third electrode 6 may preferably disposed at a boundary portion F between adjacent pixels E.

In these cases, the second and third electrodes 5 and 6 are required to be disposed apart from each other to avoid electrical conduction therebetween. Each of the second and third electrodes 5 and 6 may be disposed at a position which is the boundary portion F between adjacent pixels E and is close to the rear substrate 1b side or the display substrate 1a side. More specifically, the first to third electrodes 4, 5 and 6 may be disposed as shown in FIGS. 1(a) and 1(b). In order to stably effect halftone display as described later specifically, as shown in FIG. 1(b), it is preferable that a distance between the first electrode 4 and the third electrode 6 is set to be larger than that between the first electrode 4 and the second electrode 5.

At the spacing between the display substrate 1a and the rear substrate 1b and at the boundary portion F between the adjacent pixels E, a partition member (spacing member) 7 may preferably be disposed. In a preferred embodiment, the second electrode 5 is disposed between the partition member 7 and the display substrate 1a or between the partition member 7 and the rear substrate 1b, and the third electrode 6 is disposed between the partition member 7 and the display substrate 1a or between the partition member 7 and the rear substrate 1b. In other words, the second and third electrodes 5 and 6 may be disposed between the partition member 7 and the display substrate 1a and between the partition member 7 and the rear substrate 1b, respectively. Further, these second and third electrodes 5 and 6 may be formed within the partition member 7 or may be disposed on or within the substrate (1a or 1b) via another layer with respect to the partition member 7. Further, the second and third electrodes 5 and 6 may be somewhat protruded from the boundary portion F toward the pixel E. In order to set the distance between the first and third electrodes 4 and 6 to be larger than that between the first and second electrodes 4 and 5 as described above, the second electrode 5 is disposed between the partition member 7 and the rear substrate 1b and the third electrode 6 is disposed between the partition member 7 and the display substrate 1a.

The above-mentioned electrophoretic particles 3 and the first electrode area are required to be colored. For example, it is possible to use any color combination such that the electrophoretic particles 3 are black and the first electrode area is white or such that the electrophoretic particles 3 are white and the first electrode area is black. In the case of displaying color image, the electrophoretic particles 3 is colored black or white and the color of the first electrode area is changed pixel by pixel. The color of the first electrode area may be a combination of red, green and blue or a combination of yellow, cyan and magenta.

The coloring of the first electrode area may be performed not only by coloring the first electrode per se but also by coloring an insulating layer which is formed to cover the first electrode (e.g., with the use of a colored insulating layer alone or the use of a coloring material to be mixed in the insulating layer) without coloring the first electrode per se or by disposing a colored layer (which is not an insulating layer) so as to cover the first electrode without coloring the first electrode per se.

The insulating layer (only the insulating layer 8 for the first electrode 4 is shown in FIGS. 1(a) and 1(b)) may be formed to cover the respective electrodes 4, 5 and 6. The formation of the insulating layer is effective in preventing charge injection from the respective electrodes 4, 5 and 6 to the electrophoretic particles 3. As a material for the insulating layer, it is preferable that it is formed in ia thin film with less occurrence of pinhole and has a low dielectric constant. Examples of the material may include an amorphous fluorine-containing resin, a high transparent polyimide, an acrylic resin, etc.

As the partition member 7, it is possible to use a spacer for defining a gap (spacing) between the pair of display substrate 1a and rear substrate 1b or a partitioning member for preventing movement of the electrophoretic particles 3 toward another pixel. In the case of using the partition member 7 as the spacer, it is not necessarily disposed so as to surround the pixel since it is sufficient as long as it can define the spacing between the substrates. On the other hand, in the case of using the partition member 7 as the partitioning member, it is necessary for the partitioning member to surround the pixel in view of its function. The partition member 7 may be formed of the same material as that for the substrates 1a and 1b or a material other than that for the substrates 1a and 1b, such as a photosensitive acrylic resin. The partition member 7 may be formed by any method. For example, it is possible to use a method wherein a photosensitive resin layer is coated, followed by exposure and wet-type development, a method wherein a separately prepared barrier layer is bonded, a method utilizing a printing process, or the like.

As the substrates 1a and 1b, it is possible to use glass, quartz, etc., in addition to a plastic film of polyethylene terephthalate (PET), polycarbonate (PC), polyether sulfone (PES), etc. The display substrate 1a is required to be formed of a transparent material but the rear substrate 1b may be formed of a colored material, such as a polyimide (PI) film.

The electrodes 4, 5 and 6 may be formed of any material, as long as it is patternable, including metals such as titanium (Ti), aluminum (Al), and copper (Cu); carbon or silver paste; and an organic conductive film. When the first electrode 4 is also used as a light reflection layer, a material having a high light reflectance, such as silver (Ag) or Al, may suitably be used. When the first electrode 4 is used for white display, the electrode surface per se is provided with a surface unevenness so as to allow irregular reflection of light or a light scattering layer is formed on the electrode.

As a material for the insulating liquid 2, a transparent nonpolar solvent such a isoparaffin, silicone oil, xylene or toluene may be used.

As a material for the electrophoretic particles 3, it is possible to use such a material that it is colored and exhibits a positive or negative charge characteristic in the insulating liquid 2. For example, various inorganic or organic pigments, carbon black, and resins containing these materials may be used. The electrophoretic particles 3 may ordinarily have a particle size of 0.01–50 $\mu$m, preferably 0.1–10 $\mu$m.

In the above-mentioned insulating liquid 2 or the electrophoretic particles 3, it is preferable that a charge control agent for controlling and stabilizing chargeability of the electrophoretic particles 3 is added Examples of the charge control agent may include metal complex salts of monoazo pigments, salicylic acid, organic quaternary ammonium salts, and nigrosine-based compounds.

Further, in the insulating liquid 2, it is also possible to add a dispersing agent for maintaining a dispersion state by preventing mutual agglomeration of the electrophoretic particles 3. As the dispersing agent, it is possible to use multivalent metal phosphates such as calcium phosphate and magnesium phosphate, carbonates such as calcium carbonate, other inorganic salts, inorganic oxides, organic polymeric materials, etc.

Next, the driving method of electrophoretic display according to the present invention will be described.

The driving method of electrophoretic display of the present invention includes a reset step of collecting the electrophoretic particles 3 in a relatively small area at each pixel by attracting the electrophoretic particles 3 to the second electrode 5 to be less recognized, and a writing step of disposing the electrophoretic particles 3 in a relatively large area at each pixel by attracting the electrophoretic particles 3 located in the vicinity of the second electrode 5 to the first electrode 4 through switching of a voltage of the first electrode 4. In the driving method, an amount of movement of the electrophoretic particle 3 to the first electrode 4 is restricted by switching a voltage of the third electrode 6 to move the electrophoretic particles 3 located close to the second electrode 5 toward the third electrode 6 and at the same time, a display gradation level at an associated pixel is controlled by controlling a difference in voltage switching timing between the first electrode 4 and the third electrode 6.

The reset step and the writing step may be performed at any pixel but the control of the difference in voltage switching timing is required to be performed independently on a pixel unit basis so that different gradation levels can be displayed pixel by pixel.

The time of the writing step may preferably be set to a sum of a time required to move all the electrophoretic particles 3 in the vicinity of the second electrode 5 to the first electrode 4 and a time required to move all the electrophoretic particles 3 in the vicinity of the second electrode 5 to the third electrode 6.

A voltage of the first electrode after voltage switching (on-state voltage Vb described below) may preferably be identical to a voltage of the third electrode after voltage switching (collecting voltage Vd described below).

In this embodiment, depending on a display gradation, a driving method shown in FIGS. 2(a) to 2(c) or a driving method shown in FIGS. 3(a) to 3(e) is used. In these figures, a symbol Va represents an off-state voltage, a symbol Vb represents an on-state voltage, a symbol Vc represents a non-collectable voltage, a symbol Vd represents a collecting voltage, and a symbol Vcom represents a reference voltage. The on-state voltage Vb and the collecting voltage Bd can attract the electrophoretic particles 3 but the off-state voltage Va and the non-collectable voltage cannot attract the electrophoretic particles 3.

Figure 2:
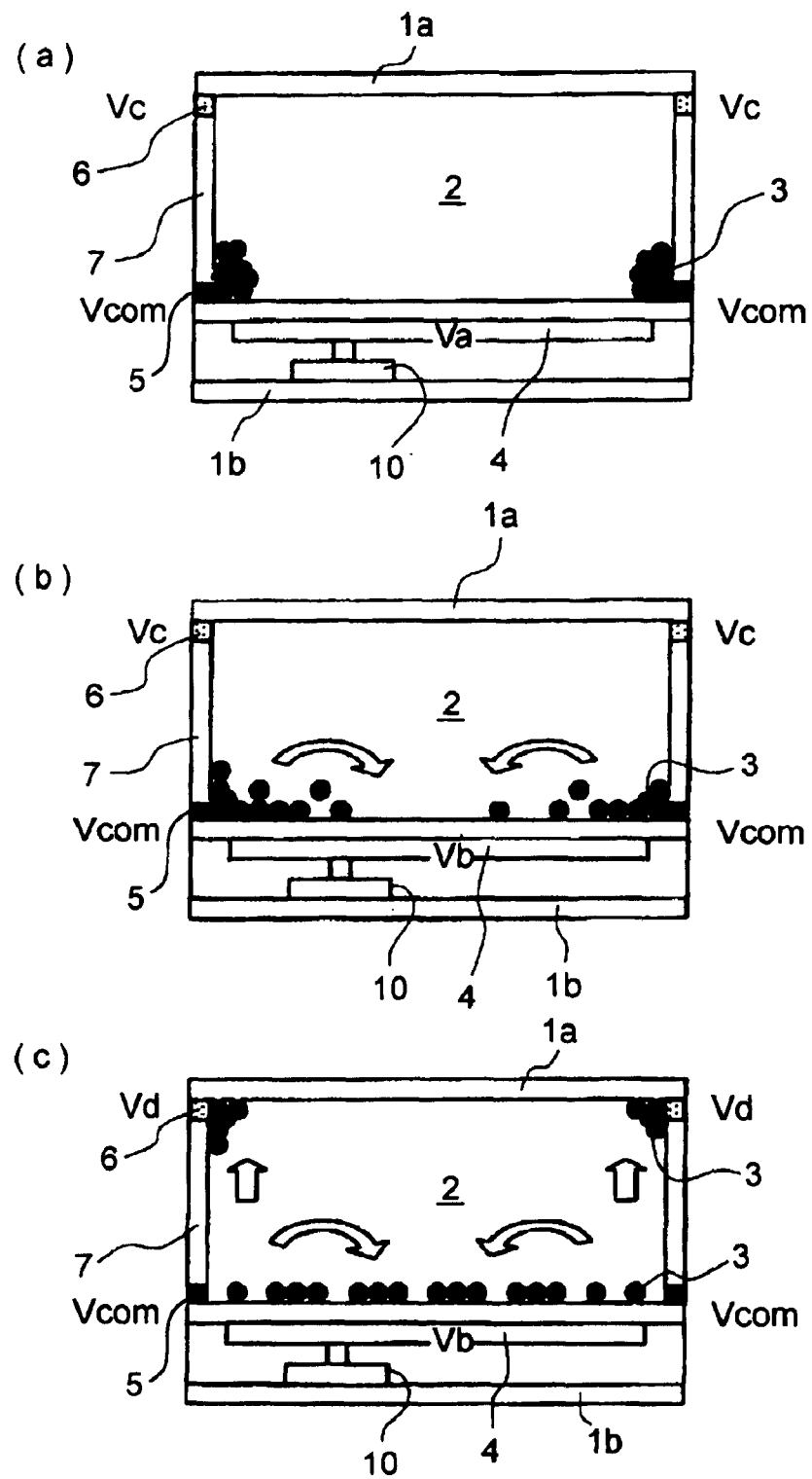
FIGS. 2(a), (b) and (c) are sectional views for illustrating an example of the driving method of an electrophoretic display according to the present invention.
Figure 3:
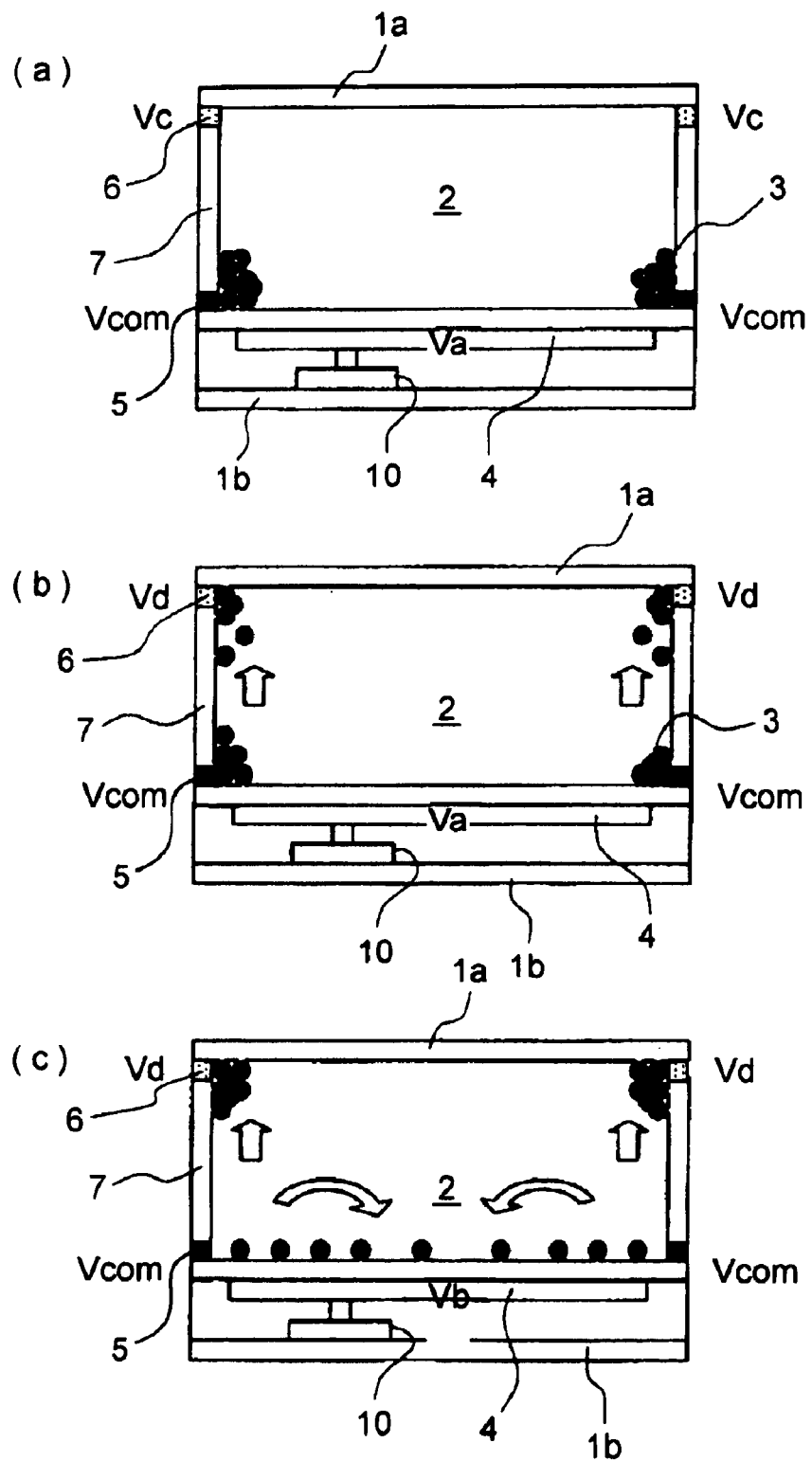
FIGS. 3(a), (b) and (c) are sectional views for illustrating another example of the display method of an electrophoretic display of the present invention.

The electrophoretic displays of FIGS. 2 and 3 are provided with a switching device 10 (described later in detail) but the switching device 10 may be omitted as in FIG. 1.

As shown in FIGS. 1(a) and 2(a), in the driving member of electrophoretic display of the present invention, the off-state voltage is applied to the first electrode 4, the reference voltage Vcom is applied to the second electrode 5, and the non-collectable voltage Vc is applied to the third electrode 6. As a result, the electrophoretic particles 3 are attracted and collected to the second electrode 5, whereby the first electrode area is exposed and display of the color of the first electrode area (e.g., white) is effected (reset operation).

Next, a writing operation is performed. In the case where the color of the electrophoretic particles 3 is intended to be emphasized, the voltage of the first electrode 4 is first switched from the off-state voltage Va to the on-state voltage Vb (at an early timing) (FIG. 2(b)), and thereafter the voltage of the third electrode 6 is switched from the non-collectable voltage Vc to the collecting voltage Vd (FIG. 2(c)). By doing so, an amount of movement of the electrophoretic particles toward the first electrode 4 is increased, so that the color of the electrophoretic particles 3 can be emphasized (i.e., when the color of the electrophoretic particles 3 is black, the resultant display gradation level becomes dark). On the other hand, in the case where the color of the electrophoretic particles 3 is not intended to be emphasized, the voltage of the first electrode 6 is first switched from the non-collectable voltage Vc to the collecting voltage Vd (FIG. 3(b)), and thereafter the voltage of the first electrode 4 is switched from the off-state voltage Va to the on-state voltage Vb (FIG. 3(c)). By doing so, the movement amount of the electrophoretic particles 3 toward the first electrode 4 is decreases, so that the color of the electrophoretic particles 3 is not emphasized.

The above described electrophoretic display may preferably be of the active matrix type wherein the switching device is provided at each pixel. Hereinbelow, the active matrix-type electrophoretic display of the present invention will be explained with reference to FIGS. 4 and 5.

Referring to these figures, the active matrix-type electrophoretic display is provided with the switching device 10 on the rear substrate 1b. The switching device 10 may be a thin film transistor (TFT) or the like. The switching device is disposed at each pixel and a drain electrode thereof is connected to the first electrode 4, so that a signal is applied to the first electrode 4. The switching device 10 may preferably be connected to the bottom of the first electrode 4. Incidentally, the first to third electrodes 4, 5 and 6 may preferably be disposed close to the insulating liquid 2 at each pixel similarly as in the above-mentioned electrophoretic displays shown in FIGS. 1–3. Further, it is preferable that the second electrodes 5 at all the pixels are electrically connected so as to be supplied with the same voltage.

Figure 4:
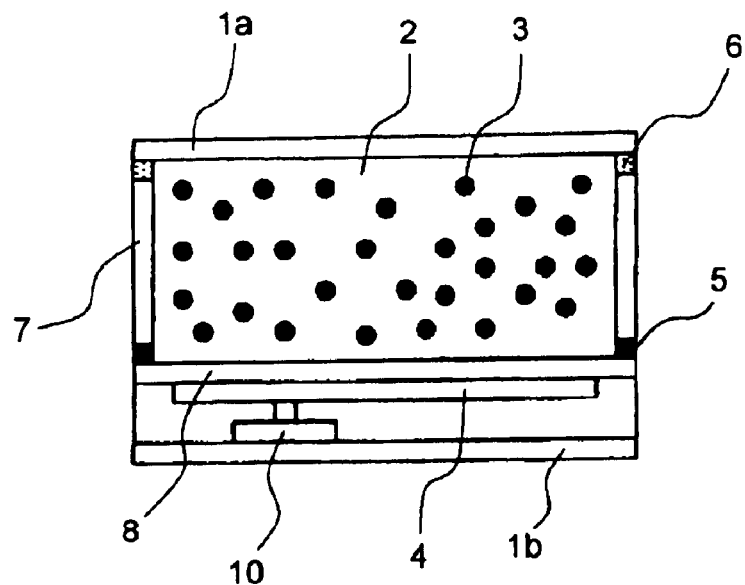
FIG. 4 is a sectional view showing another embodiment f a structure of the electrophoretic display of an active matrix-type of the present invention.

The first electrode 4 may preferably be connected with an auxiliary capacitor 11 (FIG. 5) although the auxiliary capacitor 11 is not shown in FIG. 4. When the auxiliary capacitor 11 is once charged by turning the switching device 10 on, movement of the electrophoretic particles 3 can be continued by electric charges stored in the auxiliary capacitor 11 even if thereafter the switching device 10 is turned off. In addition to the auxiliary capacitor 11, the electrophoretic display may be provided with members or circuits or effecting display, such as a drive circuit for the scanning lines and a drive circuit for the data lines, at peripheries of wiring or the display area.

Figure 5:
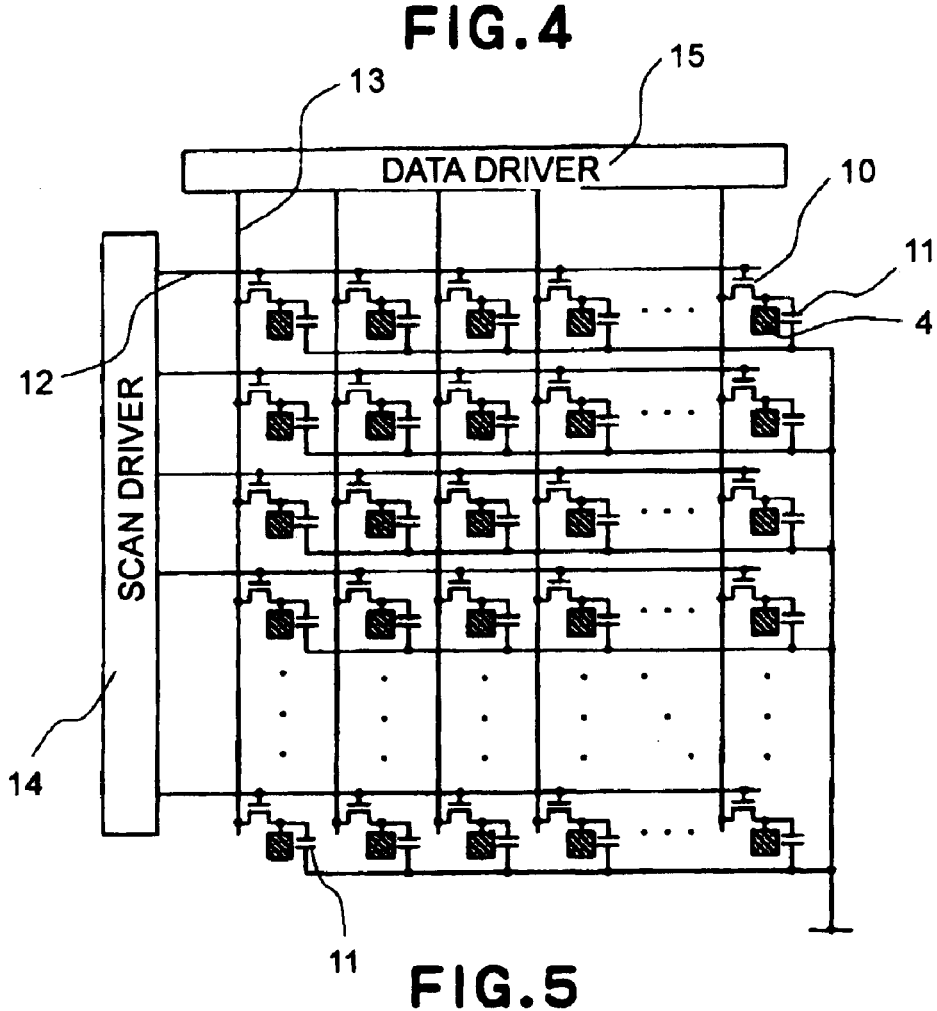
FIG. 5 is a circuit diagram showing a structure of the active matrix-type electrophoretic display.

Further, as shown in FIG. 5, a plurality of scanning lines 12 and a plurality of data lines 13 are arranged in a matrix form, and the switching device 10 may be disposed at an intersection (pixel portion) of each scanning line 12 and each data line 13. A gate electrode of the switching device 10 is connected with the scanning line 12 and a source electrode is connected with the data line 13. In this case, the switching device 10 switches a connection state of the data line 13 with the first electrode 4 between a conducting state and a non-conducting state, depending on a signal inputted from the scanning line 12. Further, the electrophoretic display is provided with a scanning line driver 14 connected with the scanning lines 12 and a data line driver 15 connected with the data lines 13. These drivers 14 an 15 may be mounted in a packaged form as a driver IC or formed in a common process with the switching devices 10.

The second electrode 4 at each pixel may preferably be connected to each other so as to retain the same potential.

Hereinbelow, an embodiment of the driving method of the active matrix-type electrophoretic display of the present invention will be described with reference to FIGS. 6 to 9.

In this driving method, voltage switching timing of the third electrode 6 is made constant irrespective of a display gradation level but voltage switching timing of the first electrode 4 is controlled depending on a display gradation level. A period for effecting a writing operation is divided into a plurality of field periods, so that the number of the field periods after the voltage switching of the first electrode 4 (i.e., the number of field periods wherein the on-state voltage Vb is applied as shown in FIGS. 7(*a*) to 7(*e*)) is changed depending on display gradation levels.

When a certain scanning line 12 is made active, all the switching devices 10 connected to the scanning line 12 are placed in an on state. At this time, a voltage outputted from the data line driver 15 is applied to the first electrodes 4 through the switching devices 10. The second electrodes 5 at the respective pixels are connected with each other at least for every scanning line, thus being supplied with the same signal. The third electrodes 6 at the respective pixels are connected with each other at least for every scanning line, thus being supplied with the same signal. By an electric field created among the first to third electrodes 4, 5 and 6, the electrophoretic particles 3 are moved.

Figures 6, 7:
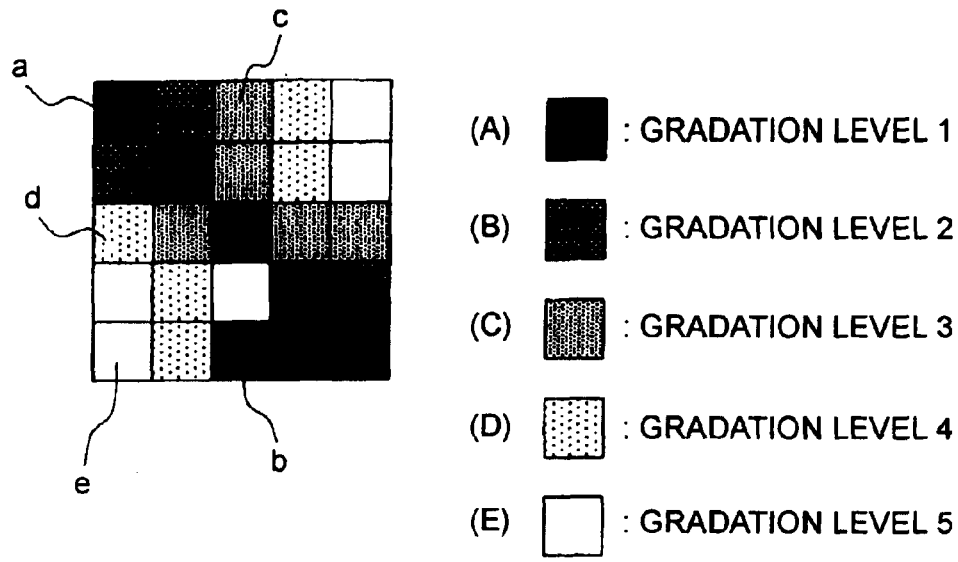
FIG. 6 is a schematic view showing an example of a display state of the active matrix-type electrophoretic display.

For convenience of explanation, in this embodiment, 5×5 pixels are employed in the electrophoretic display as shown in FIG. 6, and the electrophoretic display displays a gradation image a gadation image, shown in FIG. 6, with 5 display gradation levels (gradation levels 1 to 5).

In such an active matrix type electrophoretic display, as described above, the reset operation and the subsequent writing operation are performed. The symbols Va, Vb, Vc, Vd and Vcom are identical to those described with reference to FIGS. 2 and 3.

When a voltage of the second electrode 5 is a reference voltage Vcom, a voltage of the first electrode 4 is an off-state voltage Va, and a voltage of the third electrode 6 is a non-collectable voltage Vc, the electrophoretic particles 3 are attracted to the second electrode 5 (FIGS. 2(*a*) and 3(*a*)). When the voltage of the first electrode 4 is an on-state voltage Vb, the electrophoretic particles 3 are attracted to the first electrode 4 (FIGS. 2(*b*) and 3(*c*)). When the voltage of the third electrode 6 is a collecting voltage Vd, the electrophoretic particles 3 are attracted to the third electrode 6 (FIGS. 2(*c*) and 3(*b*)).

Hereinbelow, the respective operations will be described.
<Reset Operation>

First of all, as a reset operation, at all the pixels, the off-state voltage Va is applied to the first electrode 4, the reference voltage Vcom is applied to the second electrode 5, and the non-collectable voltage Vc is applied to the third electrode 6. As a result, the electrophoretic particles 3 are attracted to the second electrode 5 at all the pixels (FIGS. 2(*a*) and 3(*c*)).
<Writing Operation>

As described above, in order to provide five display gradation levels, it is necessary to use five types of voltage application condition to the first electrode 4 by dividing the writing operation period into four field periods (FIGS. 7(*a*) to 7(*e*)).

More specifically, at the pixels of gradation level 1, the on-state voltage Vb is applied in four field periods 1 to 4 as shown in FIG. 7(*a*). At the pixels of gradation level 2, the on-state voltage Vb is applied in these field periods 2 to 4 as shown in FIG. 7(*b*). At the pixels of gradation level 3, the on-state voltage Vb is applied in two field periods 3 and 4 as shown in FIG. 7(*c*). At the pixels of gradation level 4, the on-state voltage Vb is applied in one field period 4 as shown in FIG. 7(*d*). At the pixels of gradation level 5, the off-state voltage Va is applied in four field periods 1 to 4 as shown in FIG. 7(*e*).

In FIG. 7, a symbol A represents one field writing (rewriting) period in which a voltage is applied to the first electrode 4 and the auxiliary capacitor 11 by selectively scanning the scanning lines successively from the first line to the fifth line through output from the scanning line driver 12, thereby to electrically charge the auxiliary capacitor 11 (this also holds true in other figures). Further, a symbol B represents a holding period in which the voltage of the first electrode 4 is retained by the charged auxiliary capacitor 11 (this also holds true in other figures). In this period B, however, the electric charges stored in the auxiliary capacitor 11 are reduced through an off resistance of the switching device 10 with time, thus resulting in a gradual voltage drop.

In the case of effecting the display shown in FIG. 6, patterns of voltage application (to the first electrode 4) with respect to the respective field periods (fields 1–4) and the respective pixels are shown in FIGS. 8(*a*) to 8(*d*). More specifically, in the first field period (field 1), the off-state voltage Va or the on-state voltage Vb is applied to the pixel of each pixel as shown in FIG. 8(*a*). Similarly, in the second to fourth periods (Fields 2, 3 and 4), the voltage Va or Vb is applied to the first electrode 4 of each pixel as shown in FIGS. 8(*b*), 8(*c*) and 8(*d*), respectively.

Then, an example of a voltage switching method of the third electrode 6 will be described with reference to FIG. 9.

Figure 9:
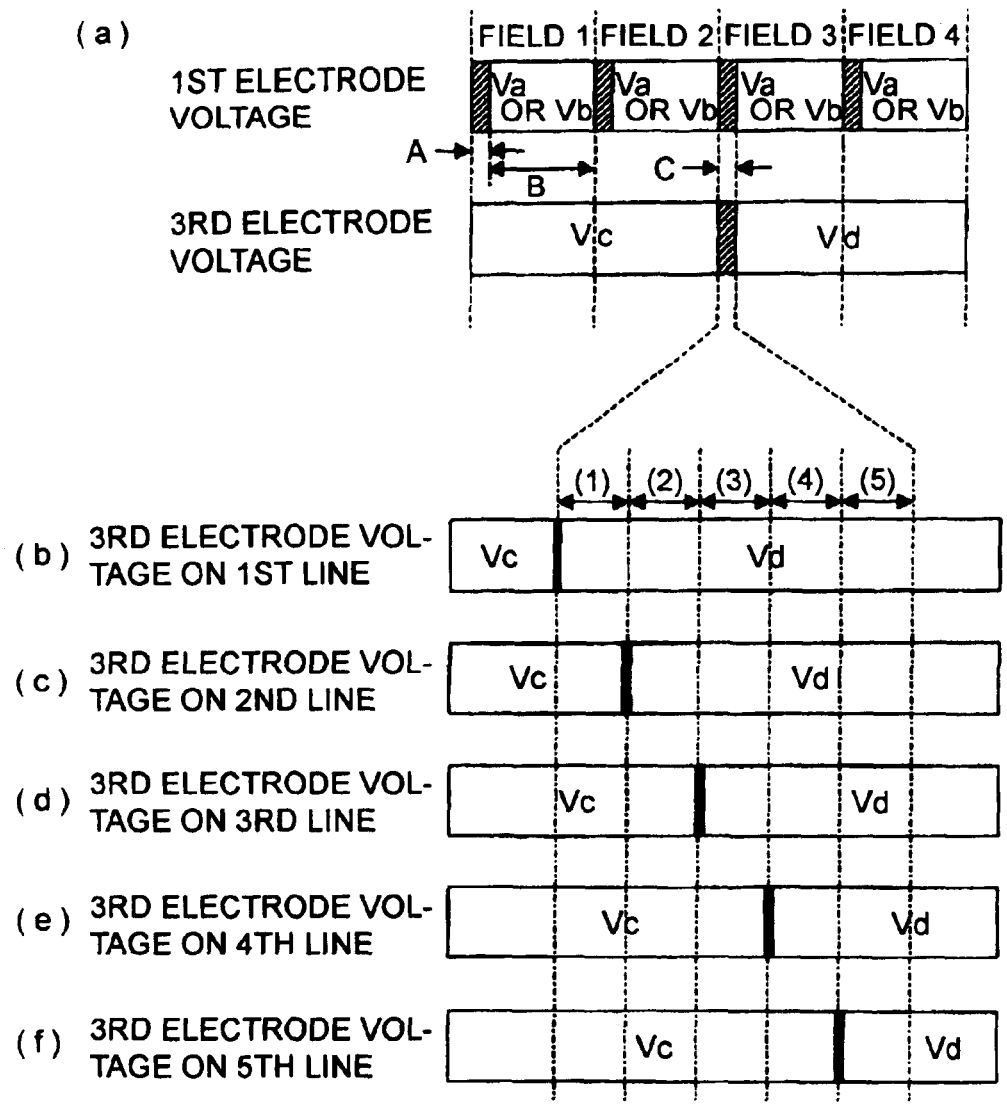
FIGS. 9(a) to (f) are schematic views showing a voltage switching timing of a third electrode at the time of writing operation (writing step).

Referring to FIG. 9(*a*), the voltage switching for the third electrode 6 may preferably be performed immediately after the start of field 3. More specifically as shown in FIGS. 9(*b*) to 9(*f*), the voltage switching may preferably be performed for every scanning line. In this case, the voltage switching is effected at the same time with respect to the pixels connected to the same scanning line 12 and is sequentially effected in the order of the first scanning line 12, the second scanning line 12, the third scanning line 12, . . . , on one scanning line basis.

In the case where the voltage switching is effected for every scanning line by first dividing a third electrode voltage switching period C (FIG. 9(*a*)) into five selection periods (1) to (5) (i.e., the number of scanning lines in this embodiment) and then performed successively on the scanning line basis shown below:

in the selection period (1), the voltage switching for the third electrode connected to the first scanning line is performed at a time indicate by a thick (vertical) line of FIG. 9(*b*), in the section period (2), the voltage switching for the third electrode connected to the second scanning line is performed at a time indicated by a thick line of FIG. 9(*c*), in the selection period (3), the voltage switching for the third electrode connected to the third scanning line is performed at a time indicated by a thick line of FIG. 9(*d*), in the selection period (4), the voltage switching for the third electrode connected to the fourth scanning line is performed at a time indicated by a thick line of FIG. 9(*e*), and in the selection period (5), the voltage switching for the third electrode connected to the fifth scanning line is performed at a time indicated by a thick line of FIG. 9(*e*).

As described above, the voltage switching for the third electrode may preferably be formed at a timing such that an associated scanning line is selected.

The reason why the voltage switching operation is performed in the manner described above is as follows.

When the first is switched, as described above, in order that the scanning lines 12 are selected line by line and a voltage is applied to an associated auxiliary capacitor 11 on one scanning line basis (i.e., it is necessary to complete injection of electric charges into the auxiliary capacitor 11 during a period wherein the on-state voltage is applied to the first electrode 4 by selecting the scanning line 12), it is necessary to ensure a time length determined by (a time of charge injection into auxiliary capacitor)×(the number of scanning lines), for one field period rewriting. Therefore, in the case where there is pixel where a voltage switching from the off-state voltage Va to the on-state voltage Vb is effected in a certain field period, at another pixel which is not connected with the selected scanning line, a voltage switching time is different from that at the voltage-switched pixel. Accordingly, by switching a voltage of the third electrode 6 from the non-collectable voltage Vc to the collecting voltage Vd every scanning line 12 at the same timing as that of sequentially selecting the scanning lines 12, it becomes possible to match a time from voltage switching of the first electrode 4 from the off-state voltage Va to the on-state voltage Vb in the writing operation to voltage switching of the third electrode 6 from the non-collectable voltage Vc to the collecting voltage Vd in the display holding operation, e.g., between a pixel where an image of gradation level 2 on the first scanning line is displayed and a pixel where an image of gradation level 2 on the fifth scanning line. As a result, it is possible to drive the electrophoretic display with good gradation accuracy.

However, compared with the movement time of the electrophoretic particles 3, if the one field rewriting period is too short, the voltage of the third electrode 6 can be switched on plural scanning lines basis (in other words, a different voltage switching timing may be adopted for each plurality of pixels).

In order to effect such a voltage switching, the third electrodes 3 are connected in common with each other on plural scanning lines basis. Alternatively, it is also possible to switch the voltage of all the third electrodes 6 at the same time based on the assumption that the voltage of the first electrode 4 is switched simultaneously at all the pixels (in other words, at all the pixels, an identical voltage switching timing is adopted for the third electrode 6). For that purpose, the third electrodes 6 at all the pixels may preferably be electrically connected in common with each other.

FIGS. 10(a) to 10(c) are schematic views showing an example of voltage switching timing of the third electrode on plural scanning lines basis.

For instance, in the case where 800 scanning lines are employed, a voltage (1) of the third electrode 6 from the first line to the 400th line is switched at the same time (FIG. 10(b)), and a voltage (2) of the third electrode 6 from the 401th line to the 800th line is switched at the same time (FIG. 1(c)).

By doing so, an influence of a slightly present difference in voltage switching timing is effectively suppressed. Further, the third electrodes 6 having the same voltage switching timing are connected with each other, so that the number of signal lines to the third electrodes 6 is reduced to two lines, thus simplifying the structure of a driving system.

In the case where the number of scanning lines is 800, e.g., a voltage (1) of the third electrode 6 from the 1st line to the 400th line is switched at the same time (FIG. 11(b)), a voltage (2) of the third electrode 6 from the 401th line to the 800th line is switched at the same time, and a voltage (3) of the third electrode 6 from the 801th line to the 1200th line is switched at the same time (FIG. 11(d)).

Figure 10:
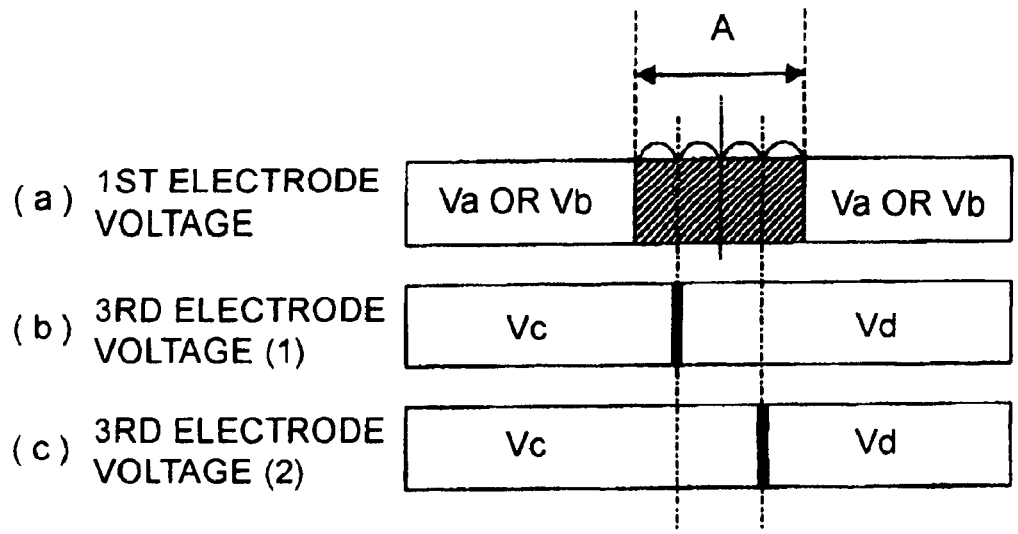
FIGS. 10(a), (b) and (c) are schematic views for illustrating an embodiment wherein a voltage of the third electrode is switched in two levels on a plurality of scanning lines basis.

By doing so, similarly as in the case of FIG. 10, an influence of a slightly present difference in voltage switching timing is effectively suppressed. Further, the third electrodes 6 having the same voltage switching timing are connected with each other, so that the number of signal lines to the third electrodes 6 is reduced to three lines, thus simplifying the structure of a driving system.

Figure 12:
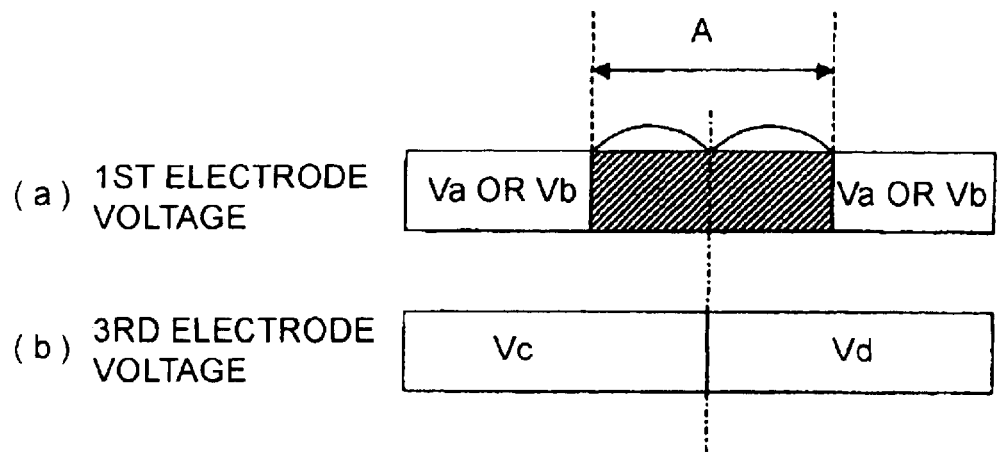
FIG. 12 is a schematic view showing an embodiment wherein a voltage of all the third electrodes is switched at the same time.

FIG. 12 is a schematic view showing an embodiment wherein a voltage of the third electrode 6 is switched simultaneously at al the pixels.

Figure 11:
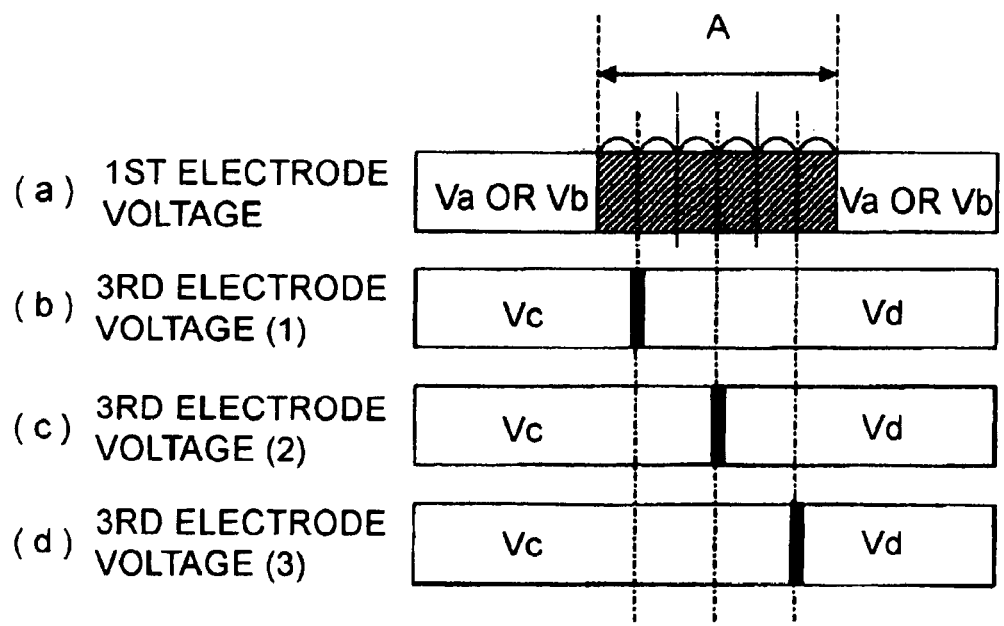
FIGS. 11(a) to (d) are schematic views for illustrating an embodiment wherein a voltage of the third electrode is switched in three levels on a plurality of scanning lines basis.

Referring to FIG. 12, the voltage of the third electrode 6 is switched at the midpoint of one field rewriting period, so that similarly as in the case of FIGS. 10 and 11, an influence of a slightly present difference in voltage switching timing is effectively suppressed. Further, the third electrodes 6 having the same voltage switching timing are connected with each other, so that the number of signal lines to the third electrodes 6 is reduced to one line, thus simplifying the structure of a driving system.

Incidentally, in the embodiment shown in FIG. 9, the voltage switching of the third electrode 6 is performed immediately after the start of field 3 but may be performed immediately after the start of other fields or at an arbitrary timing other than timings of the start of the fields 1 to 4.

Further, by changing a display data so as to realize a desired gradation level, it is also possible to adjust the voltage switching timing for the first electrode 4 or the third electrode 6.

In the above-mentioned embodiments of the driving method according to the present invention, the five gradation levels (FIG. 6) and the divided four fields (FIG. 7) are employed but the number of display gradation levels and the number of fields may be arbitrarily set. For example, as shown in FIG. 13, in the case of dividing a writing operation period T into n field periods (f1, f2, . . . , fn), the number of resultant display gradation levels is n+1.

Figure 13:
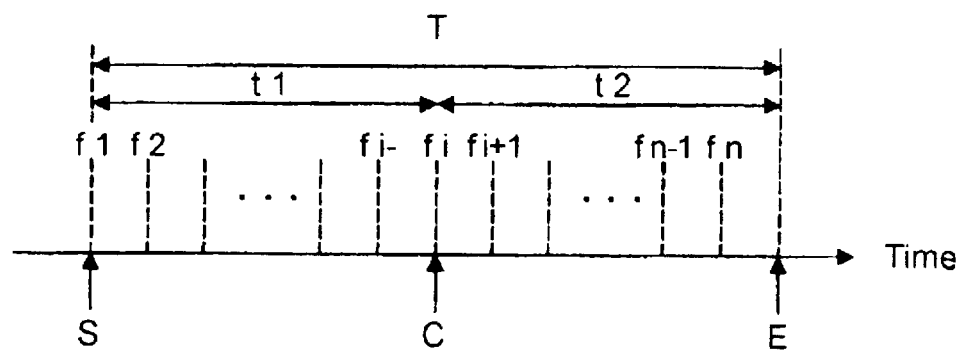
FIG. 13 is a time chart for illustrating a method of determinating a length of a writing operation period.
Figure 14:
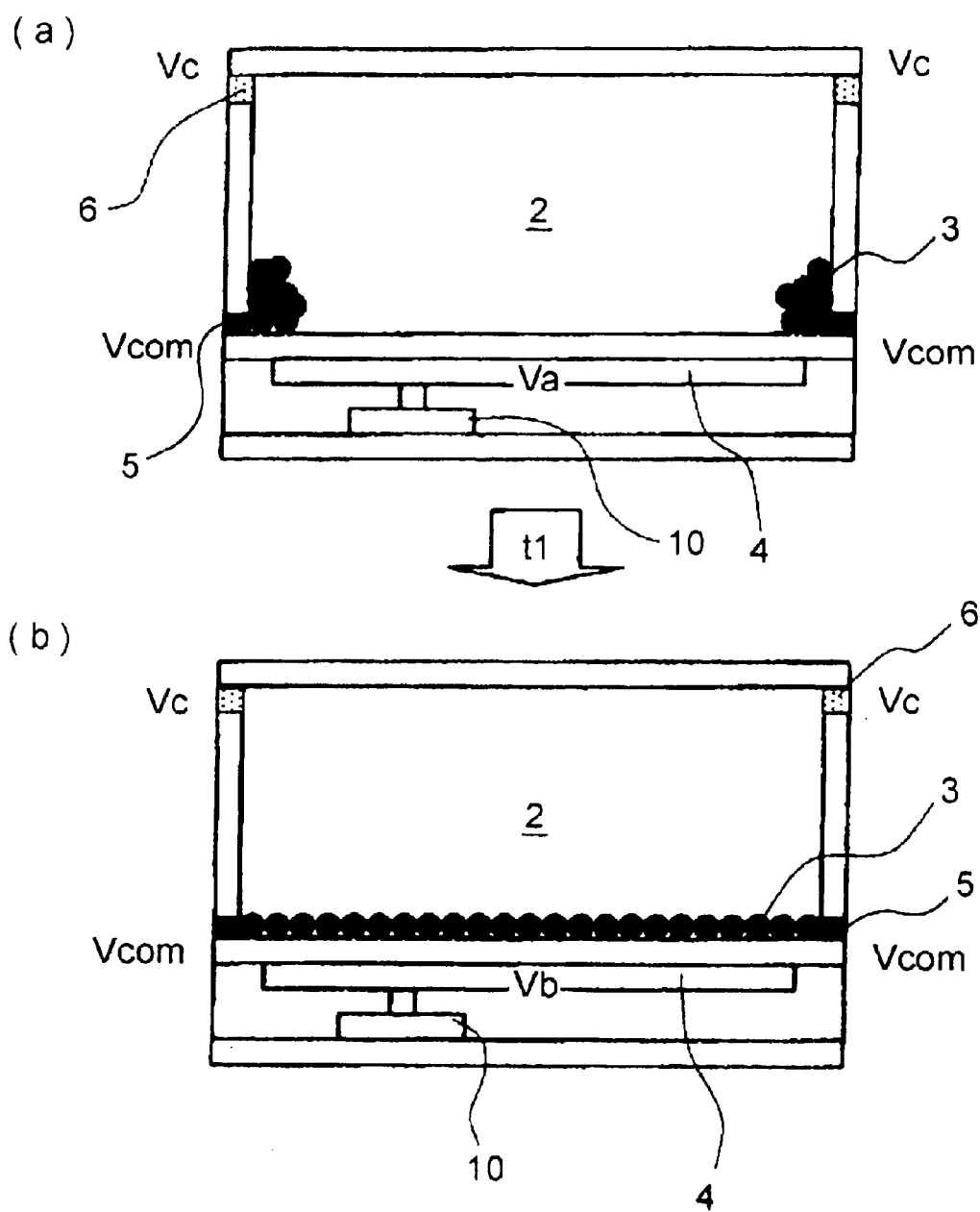
FIGS. 14(a) and (b) are sectional views showing an embodiment of a movement state of electrophoretic particles.
Figure 15:
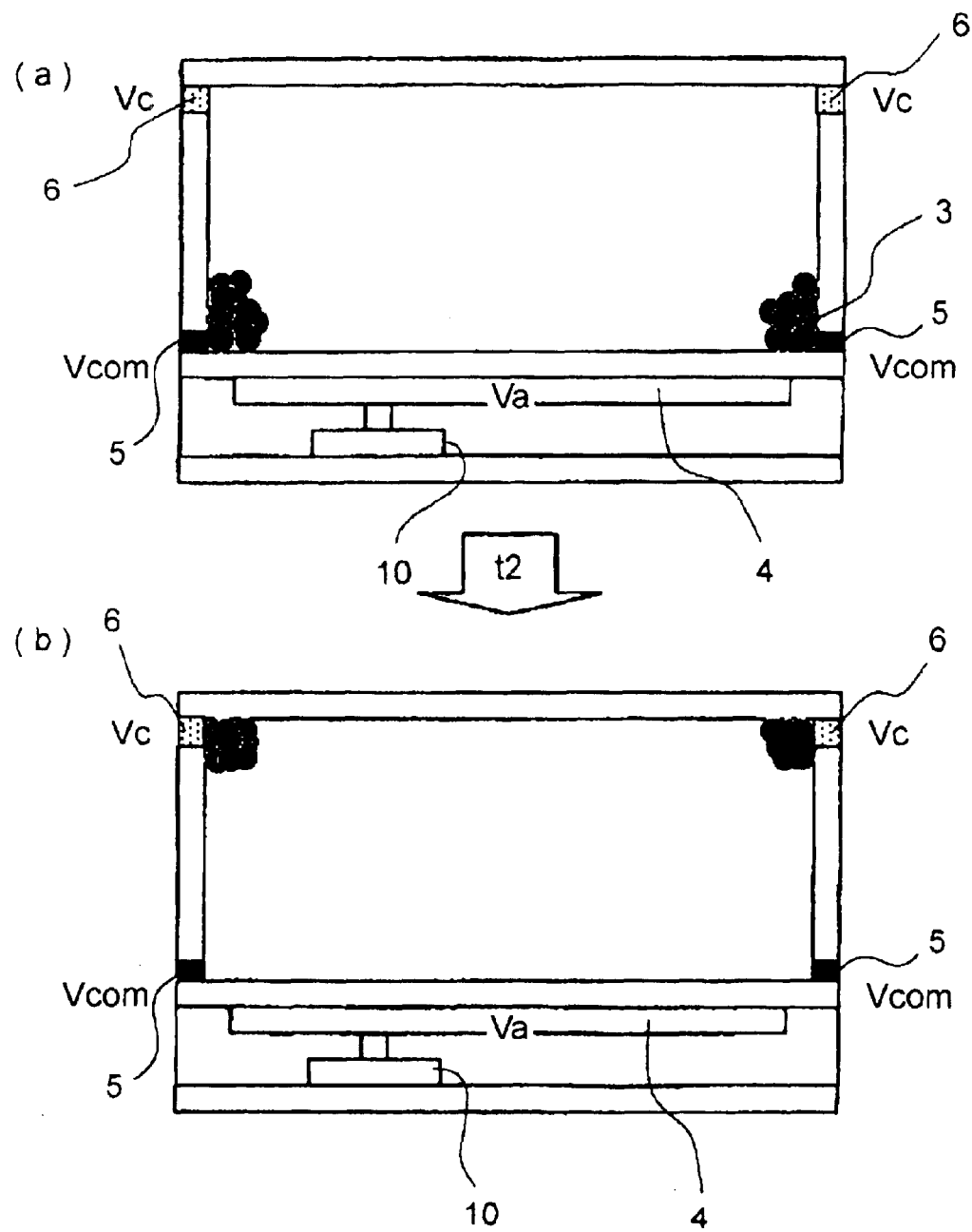
FIGS. 15(a) and (b) are sectional views showing an embodiment of another movement state of electrophoretic particles.

In FIG. 13, the abscissa axis represents a time axis, a symbol S represents the time of start of writing operation, a symbol E represents the time of end of writing operation, and a symbol C represents a voltage switching timing of the third electrode. The time length T of the writing operation and the third electrode voltage switching field (fi in FIG. 13) may appropriately be determined in view of movement time (responsiveness) of the electrophoretic particles 3. A time length t1 from the start (S) of the writing operation to the voltage switching time (C) may preferably be a time from a reset state in which the electrophoretic particles 3 are collected at the second electrode 5 (as shown in FIG. 14(a)) to completion of movement of the electrophoretic particles 3 to the first electrode 4 for black display (as shown in FIG. 14(b)). Further, a time length t2 from the voltage switching time (C) to the completion (E) of the writing operation may preferably be a time from a reset state in which the electrophoretic particles 3 are collected at the second electrode 5 (as shown in FIG. 14(a) to completion of movement of all the electrophoretic particles 3 to the third electrode 6 (as shown in FIG. 14(b)). The time length T from the start (S) to the end (E) of writing operation is the sum of the time lengths t1 and t2. More specifically, the time length T of the writing step is the sum of the time t1 required for moving all the electrophoretic particles 3 locate in the vicinity of the second electrode 5 to the first electrode 4 and the time t2 required for moving all the electrophoretic particles 3 located in the vicinity of the second electrode 5 to the third electrode 6. A length of each of the field periods f1, f2, . . . , fn may be the same or different field by field, and the number thereof may appropriately be set depending on the number of gradation levels by division of the time lengths t1 and t2.

Referring again to FIG. 6, driving (display) states of pixels a to e (for displaying gradation levels 1 to 5, respectively) are described.

At pixel a (for gradation level 1), as shown in FIG. 7(a), the voltage of the first electrode 4 is switched to the on-state voltage Vb in field 1 immediately after start of writing operation. As a result, movement of the electrophoretic particles 3 to the first electrode 4 is almost completed in fields 1 and 2. Immediately after start of field 3, the voltage of the third electrode 6 is changed from the non-collectable voltage Vc to the collecting voltage Vd but movement of the electrophoretic particles toward the third electrode 6 is little observed. As a result, at the pixel a, black display is effected. In other words, at the pixel a, the movement of the electrophoretic particles 3 from the second electrode 5 to the third electrode 6 is little observed, so that such a movement behavior from the state of FIG. 14(a) to the state of FIG. 14(b) is only observed.

At pixel b (for gradation level 2), the first electrode 4 voltage switching is performed at the start time of field 2 (FIG. 7(b)), so that the movement of the electrophoretic particles 3 to the first electrode 4 is not completed. As a result, a larger amount of the electrophoretic particles 3 still remain at the second electrode 5 (FIG. 2(b)). Thereafter, the remaining electrophoretic particles 3 are moved to both of the first electrode 4 and the third electrode 6 (FIG. 2(c)).

At pixel c (for gradation level 3), the first electrode 4 voltage switching and the third electrode 6 voltage switching are performed substantially at the same time, so that the electrophoretic particles 3 are moved to both of the first electrode 4 and the third electrode 6. At this pixel c, an amount of movement of the electrophoretic particles 3 from the second electrode 5 to the first electrode 4 is reduced when compared with the case of the pixel b, so that a resultant gradation level is different from the case of the pixel b by that much.

At pixel d (for gradation level 4), the first electrode 4 voltage is the off-state voltage Va in fields 1 to 3 and is switched to the on-state voltage Vb at the start time of field 4 (FIG. 7(d)). In other words, the third electrode 6 voltage switching is effected earlier than the first electrode 4 voltage switching, so that an amount of movement of the electrophoretic particles 3 from the second electrode 5 to the first electrode 4 is further reduced.

At pixel e (for gradation level 5), the voltage of the first electrode 4 is still the off-state voltage Va through all the fields 1 to 4. As a result, the electrophoretic particles 3 are not moved to the first electrode 4 but moved to the third electrode 5, thus performing white display.

Then, brightness at the respective pixels will be described.

With respect to the pixel a, the black display state is obtained, so that the resultant brightness is lowest. With respect to the pixels b, c and d, the electrophoretic particles 3 are collected to both the first electrode 4 and the third electrode 6 in either case but the amounts of the electrophoretic particles 3 collected at the first electrode 4 of the pixels b, c and d are different from each other, so that the resultant brightness are also different from each other at the respective pixels. When comparison between the pixel b and the pixel c is made, the movement of the electrophoretic particles 3 to the first electrode 4 at the pixel b is effected earlier than at the pixel c, so that the resultant amount of the electrophoretic particles collected on the first electrode 4 at the pixel b is larger than that in the case of the pixel c. As a result, the brightness at the pixel b is lower than that at the pixel c.

When comparison between the pixel c and the pixel d is made, the movement of the electrophoretic particles 3 to the first electrode 4 at the pixel c is effected earlier than at the pixel d, so that the resultant amount of the electrophoretic particles collected on the first electrode 4 at the pixel c is larger than that in the case of the pixel d. As a result, the brightness at the pixel c is lower than that at the pixel d. Accordingly, the brightness at the respective pixels a to e satisfy the following relationship: pixel (darkest)<pixel b<pixel c<pixel d<pixel e (brightest). As a result, halftone images can be displayed.

Next, a display (state) holding operation after the writing operation is completed will be explained.

In the display holding operation, the last rewriting field data is continuously written while continuously applying the on-state voltage Vb to the third electrode 6, whereby the last display state is retained to effect still image display. In such a case, the on-state voltage Vb may be continuously applied to all the first electrode 4. In order not to create such an electric field that the electrophoretic particles 3 collected at the first electrode 4 or the third electrodes 6 are moved from the first electrode 4 to the third electrode 6 or from the third electrode 6 to the first electrode 4, it is considered to be preferable that the applied voltages to the first electrode 4 and third electrode 6 satisfy the relationship: Vb (on-state voltage)=Vd (collecting voltage) (i.e., the first electrode voltage b after the voltage switching is identical to the third electrode voltage Vd after the voltage switching). Further, the electrophoretic phenomenon exhibits a memory characteristic, so that the still image can be displayed even if no electric field state is created within pixel. In this case, the switching devices 10 at all the pixels are turned off without applying the voltages to the first electrodes 4 to change the voltages applied to all the data lines 13 to the reference voltage Vcom. In correspondence with gradual voltage drop of the first electrode 4 to the reference voltage Vcom of the second electrode 5 through a decrease in electric charge stored in the auxiliary capacitor 11, the third electrode 6 voltage is gradually changed from the collecting voltage Vd to the reference voltage Vcom. This is because if the first electrode 4 voltage is abruptly changed to the reference voltage Vcom, the electrophoretic particles 3 are liable to be moved due to an abrupt change in internal electric field and occurrence of counter electric field. As a result, there is ia possibility that the resultant display state is disturbed.

In the case of rewriting the display state to another display state, another still image is displayed by successively performing again the reset operation, the writing operation and the display holding operation.

According to the above-described embodiments, the electrophoretic particles located in the vicinity of the first electrode 5 are attracted toward the first electrode 4 by switching the voltage applied to the first electrode 4 so as to be readily visually identified, and the amount of movement of the electrophoretic particles 3 toward the first electrode 4 by switching the voltage applied to the third electrode 6 to move the electrophoretic particles 3 located in the vicinity of the second electrode 5 toward the third electrode 6 is restricted. However, by controlling a difference in voltage switching timing between the first electrode 4 and the third electrode 6, a display gradation level at each pixel is controlled. In the case where the distance between the first electrode 4 and the third electrode 6 is set to be longer than the distance between the first electrode 4 and the second electrode 5, the electrophoretic particles 3, which do not contribute to display operation, do not remain in the vicinity of the second electrode 5 but are located (isolated) in a position apart from the first electrode 4 (in the vicinity of the third electrode 6) after the electrophoretic particles 3 are moved to the first electrode 4 or the third electrode 6 as described above (e.g., in such a state that the still image is displayed over the entire display area of the electrophoretic display). For this reason, even if thereafter the voltage is continuously applied, it is possible to continuously display the still image with halftone without changing the amount of the electrophoretic particles 3 distributed over the first electrode 4. As a result, it is possible to stably effect the halftone display. Further, even in the case of creating the non-electric field state within pixel, the electrophoretic particles, which do not contribute to the display, are isolated from those on the first electrode and located on the third electrode (other than the first electrode), so that the electrophoretic particles are not moved by the influence of a residual electric field created by electric charges remaining on the auxiliary capacitor at each pixel. As a result, a still image display with a stable halftone can be effected. Further, by decreasing the third electrode voltage simultaneously with reduction in residual electric field, it is possible to create the non-electric field state within each pixel without causing movement of the electrophoretic particles. As a result, it is possible to realize a still image display with a suppressed power consumption. Further, the electrophoretic particles are moved along and in the vicinity of the constitutional members within each pixel and contact the constitutional members or mutually contact each other in the display holding state, so that it becomes possible to effect the still image display stably also with time.

Hereinafter, the present invention will be described more specifically based on Examples.

Example 1

In this example, an active matrix-type electrophoretic display as shown in FIGS. 4 and 5 is prepared.

A partition wall (partition member) 7 of epoxy resin is disposed between a 1.1 mm-thick glass display substrate (display-side substrate) 1a and a 1.1 mm-thick glass rear substrate (backside substrate) 1b so as to surround a pixel. The partition wall 7 has a width of 10 $\mu$m, a length of 100 $\mu$m and a height of 20 $\mu$m. A 150 nm-thick square first electrode 4 (80 $\mu$m×80 $\mu$m at each pixel) of Al is disposed on the rear substrate 1b side at a central portion in a planar area surrounded by the adjacent partition walls 7. A 150 nm-thick second electrode 5 (width=10 $\mu$m, length=100 $\mu$m) of Ti is disposed between the rear substrate 1b and the partition wall 7. The second electrodes 5 at respective pixels are electrically connected with each other so as to be supplied with the same voltage. A 150 nm-thick third electrode 6 (width=10 $\mu$m, length=100 $\mu$m) of Ti is disposed between the display substrate 1a and the partition wall 7. On the rear substrate 1b, 50 nm-thick 1200 scanning lines 12 (width=5 $\mu$m, length=120 mm in total) of Cr are disposed and connected to the third electrodes 6. Hereinafter, these scanning lines 12 are referred to as a third electrode 6 <1> to a third electrode 6 <1200> for convenience for explanation. The electrophoretic display further includes, as shown in FIG. 5, a plurality of switching devices 10 of TFT, a plurality of auxiliary capacitors 11, 150 nm-thick 1200 data lines 13 (width=5 $\mu$m, length=120 mm in total) of Cr, a scanning line driver 14, and a data line driver 15. The electrophoretic display has 1200×1200 pixels each having a size of 100 $\mu$m×100 $\mu$m.

More specifically, the electrophoretic display is prepared in the following manner.

First, on the surface of the rear substrate 1b, the switching devices 10, the auxiliary capacitors 11, the scanning lines 12 and the data lines 13 are formed, and then the first electrodes 4 are formed so as to be connected with associated switching devices 10, respectively. Each of the first electrodes 4 is formed of aluminum having a large light reflectance and is coated with a 2 $\mu$m-thick acrylic resin layer 8 containing titanium oxide fine particles. The thus formed first electrodes 4 also function as a light reflection layer and the acrylic resin layer 8 exhibits a light scattering effect.

At a boundary portion F of each pixel, the second electrode 5 is formed and thereon, the partition wall 7 is formed. On the partition wall 7, the third electrode 6 is formed.

At each pixel, an insulating liquid 2 and electrophoretic particles 3 are filled. The insulating liquid 2 is formed of isoparaffin (trade name "Isopar", mfd. by Exxon Corp.) and contains succinimide (trade name "OLOA 1200", mfd. by Chevron Corp.) as a charge control agent. As the electrophoretic particles 3, particles of a polystyrene-polymethylmethacrylate copolymer containing carbon black (particle size: 1–2 $\mu$m) are used. The electrophoretic particles 3 show a positive chargeability.

Then, the display substrate 1a is bonded to the third electrode 6 (formed on the partition wall 7) to seal the insulating liquid 2 and the electrophoretic particles 3 within each pixel.

Figure 16:
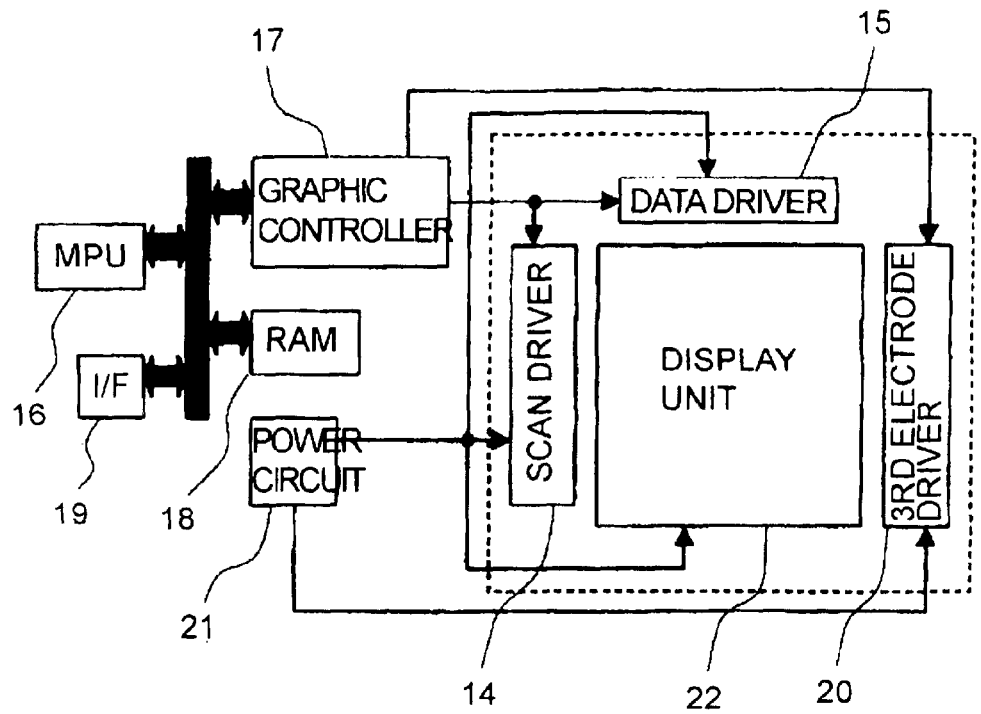
FIG. 16 is a block diagram showing an embodiment of a driving system of the electrophoretic display.

Further, as shown in FIG. 16, at a periphery of a display unit 22, IC drivers including a scanning line driver 14, a data line driver 15 and a third electrode driver 20 are mounted so that the scanning line driver 14 is connected with the scanning lines 12, the data line drive 15 is connected with the data lines 13, and the third electrode driver 20B is connected with the third electrodes 6.

Hereinbelow, a driving method of the above prepared electrophoretic display will be described.

Referring to FIG. 16, image data inputted from an interface I/F 19 is converted into display data by a microprocessing unit MPU 16, and is written in a random access memory RAM 18. Then, the MPU 16 reads the display data from the RAM 18 and transfers the display data to a graphic controller 17. The graphic controller 17 generates interface signals, which are transferred to the scanning fine driver 14, the data line driver 15 and the third electrode driver at the periphery of the display unit 22. The interface signals includes a field synchronizing signal (FLM), a horizontal synchronizing signal (CL1), 8 bit data (D0 to D7), a data grabbing clock (CL2), a reset signal <1> (RST1), a reset signal <2> (RST2), reset signal <3> (RST3), 0 V-output signal <1> (ZERO1), V-output signal <2> (ZERO2), a maintaining signal (ME), and a voltage switching signal (VSW). These signals are transmitted to apply a drive voltage to the scanning lines 13 and the third electrode 6 <1> to the third electrode 6 <1200 >, thus effecting display.

Figure 17:
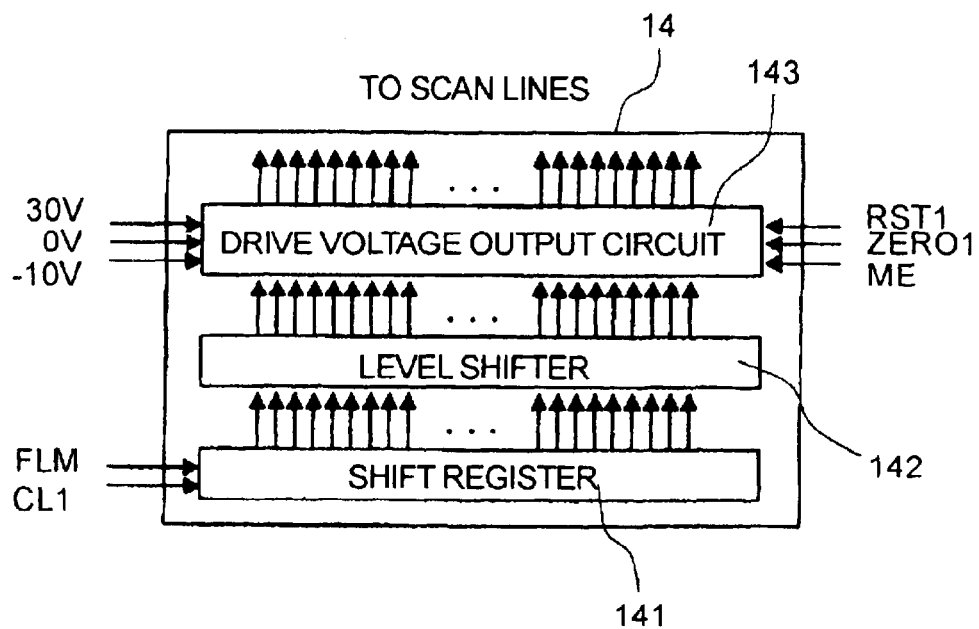
FIG. 17 is an internal block diagram of a scanning line driver.

Next, the scanning line driver 14 and the data line driver 15 disposed at the periphery of the display unit 22 will be described. FIG. 17 is an internal block diagram of the scanning line driver 14, FIG. 18 is an internal block diagram of the data line driver 15, and FIG. 18 is an operation time chart.

Referring to FIG. 17, the scanning line driver 14 has 1200 output lines and includes therein a 1200-stage shift register 141. Field synchronizing signal (FLM) data are grabbed at a falling edge of the horizontal synchronizing signal (CL1) and the successively shifted. Output signals of the shift register 141 are converted into those of drive voltage level by a level shifter. Thereafter, in a drive voltage output circuit 143, a selection voltage and a non-selection voltage are selected by an analog switch and are outputted as scanning signals. At this time, the reset signal <1> (RST1), the 0

V-output signal <1>(ZERO1), and the maintaining signal (ME) are inputted at low level. Further, when the reset signal <1> (RST1) is inputted at high level, and the 0 V-output signal <1> (ZERO1) and the maintaining signal (ME) are inputted at low level, the selection signal is outputted from all the outputs. When the 0 V-output signal <1> (ZERO1) is inputted at high level, and the reset signal <1> (RST1) and the maintaining signal (ME) are inputted at low level, 0 (zero) V is outputted from all the outputs. When the maintaining signal (ME) is inputted at high level, and the reset signal <1> (RST1) and the 0 V-output signal <1> (ZERO1) are inputted at low level, the non-selection signal is outputted from all the outputs.

Figure 18:
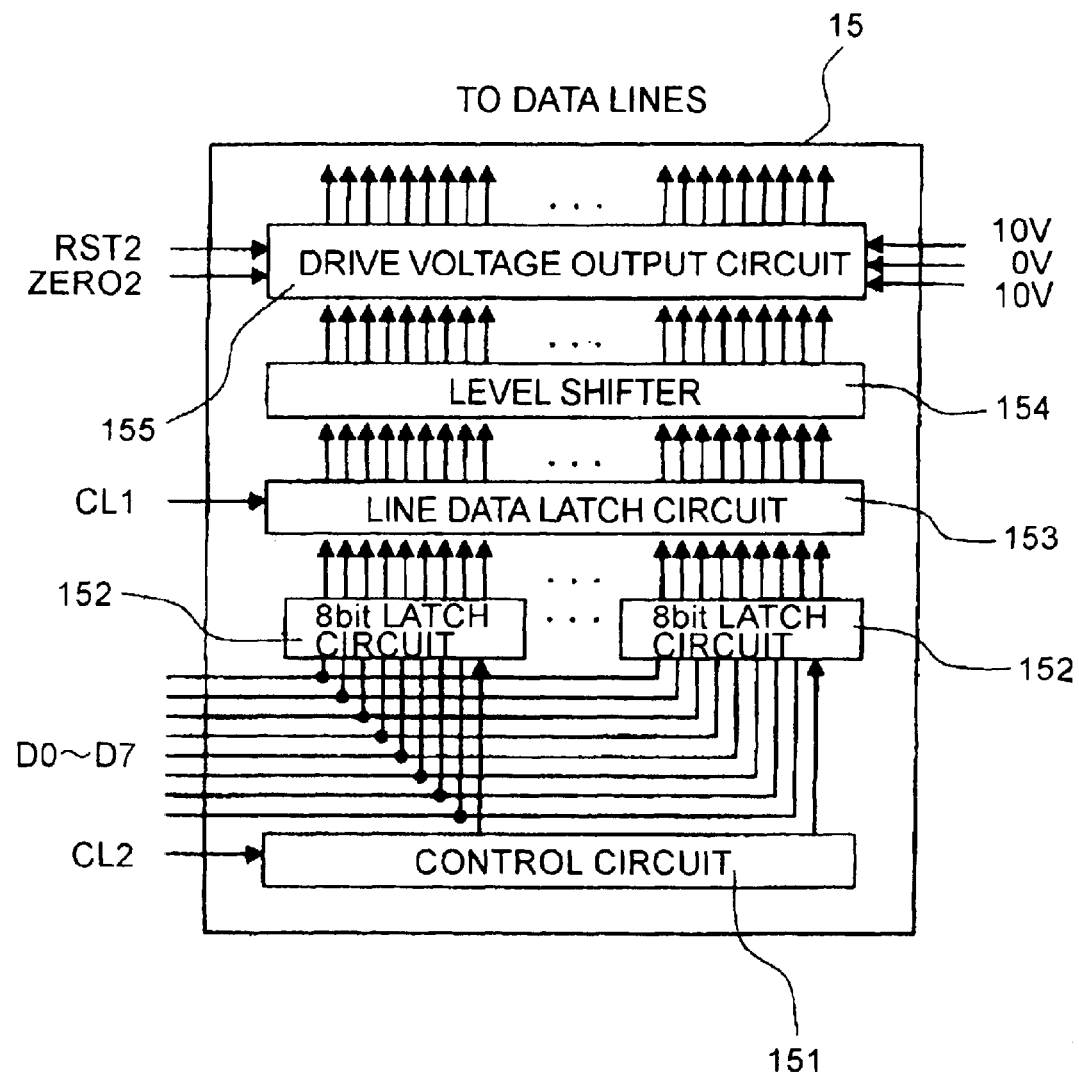
FIG. 18 is an internal block diagram of a data line driver.

Referring to FIG. 18, the data line driver 15 has 1200 outputs and outputs on-state voltage/off-state voltage to the data lines depending on display data. In synchronism with the falling edge of the data grabbing clock (CL2), at the falling edge of output from a control circuit 151, 8 bit data (D0 to D7) are successively latched in 8 bit latch circuits 152. When data for one line are latched in the 8 bit latch circuit 152, all the data are simultaneously latched in a line data latch circuit 153 at the rising edge of the horizontal synchronizing signal (CL1). In correspondence with data from the line data latch circuit 153, the one line data are converted into those at drive voltage level by a level shifter 154 and in a drive voltage output circuit 155, on-state voltage off-state voltage are selected by analog switch and outputted as data signals. At this time, the reset signal <2> (RST2) and the 0 V-output signal <2> (ZERO2) are inputted at low level. When the reset signal <2> (RST2) is inputted at high level and the 0 V-output signal <2> (ZERO2) is inputted at low level, the off-state voltage is outputted from all the outputs. When the 0 V-output signal <2> (ZERO2) is inputted at high level and the reset signal <2> (RST2) is inputted at low level, 0 (zero) V is outputted from all the outputs.

Figure 20:
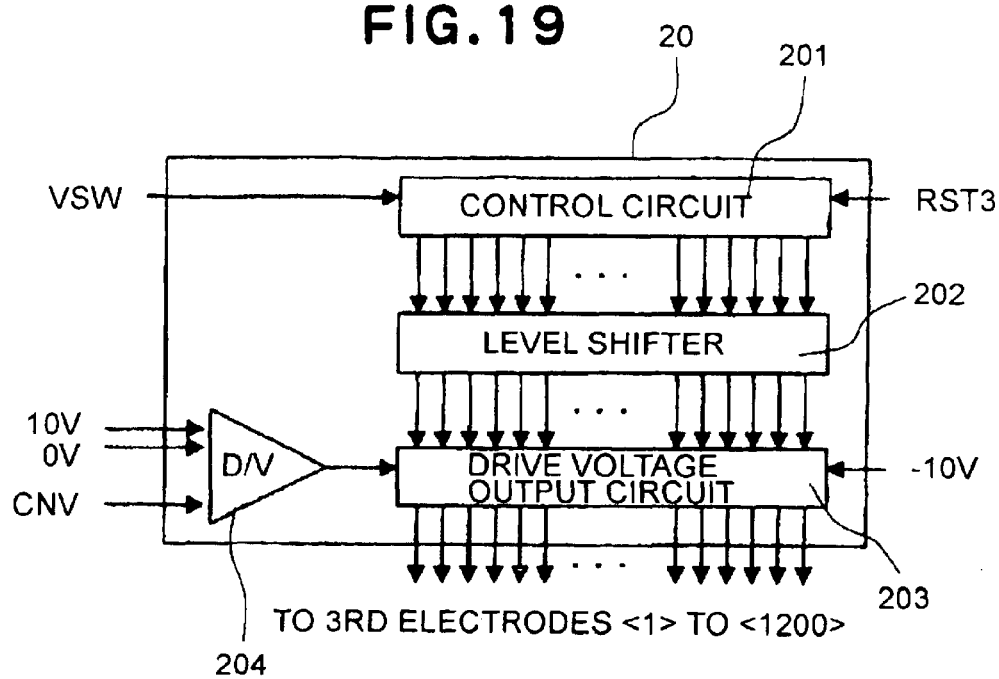
FIG. 20 is an internal block diagram of a third electrode driver.
Figure 21:
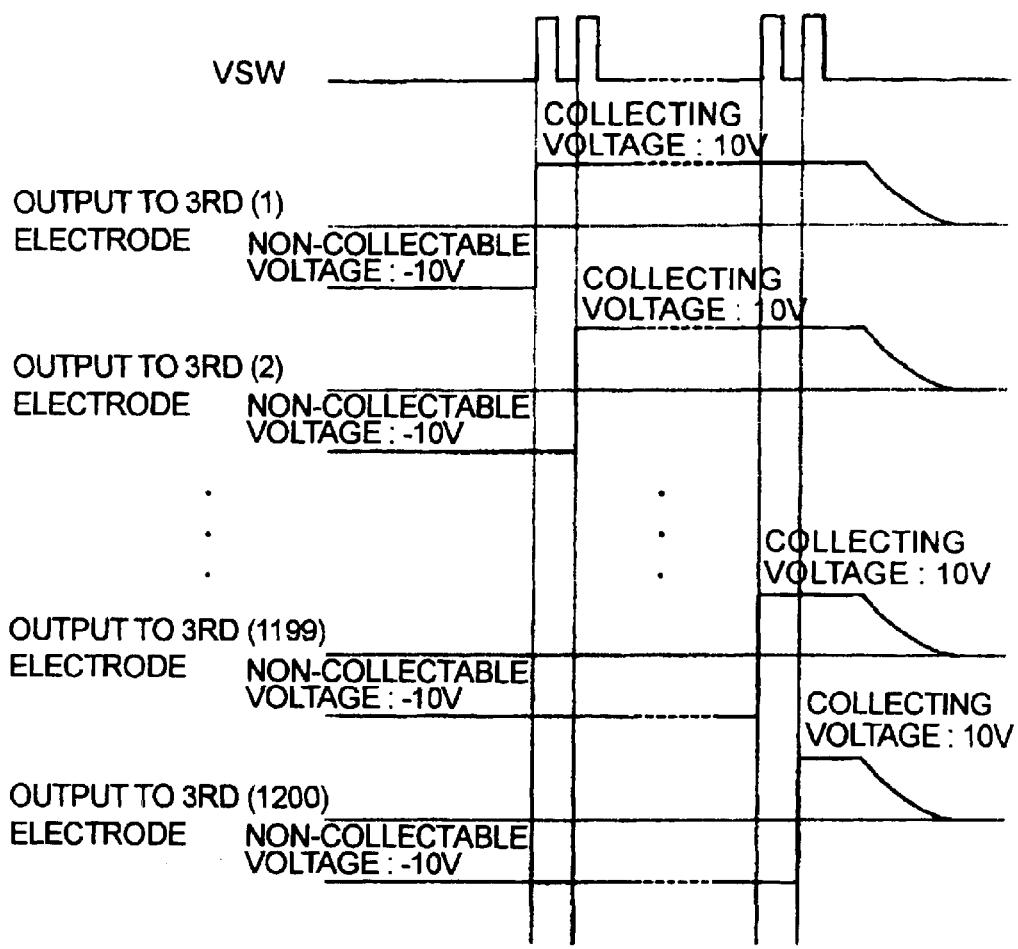
FIG. 21 is an operation time chart.

Next, the third electrode driver 20 will be described with reference to FIG. 20 showing its internal block diagram and FIG. 21 showing its operation time chart.

Referring to FIG. 20, the third electrode driver 20 has 1200 outputs. An output from a control circuit 201 is successively switched from the first output to the 1200th output at each of the rising edges of the voltage switching signal (VSW). The output from the control circuit 201 is converted into that at drive voltage level by a level shifter 202 and in a drive voltage output circuit 203, a collecting voltage and a non-collectable voltage are selected by analog switch to be outputted to a third electrode 6 <1> to a third electrode 6 <1200 >. The collecting voltage is supplied from a 8 bit D/A converter 204 and can be changed by a 8 bit voltage control signal (CNV) sent from the graphic controller 17. In the case where the collecting voltage is outputted from the third electrode driver 20, in synchronism with a change in output from the D/A converter 204, it is possible to change the output from the third electrode driver 20. As shown in FIG. 21, in synchronism with the rising edges of the voltage switching signal (VSW), the non-collectable voltage is switched to the collecting voltage with respect to outputs to the third electrode 6 <1> to the third electrode 6 <1200 > in succession. Thereafter, the output from the D/A converter 204 is changed to gradually lower the collecting voltage. At this time, the reset signal <3> (RST3) is inputted at low level. When the reset signal <3> (RST3) is inputted at high level, the output from the control circuit is reset, so that the non-collectable voltage is outputted from all the outputs.

A power supply circuit 21 supplies the drive voltage for driving the display panel to the scanning line driver 14, the data line driver 15 and the third electrode driver 20, and supplies a power for driving logic circuits, such as the shift register and the latch circuit, within each of the drivers. The power supply circuit 21 further supplies a voltage to the scanning electrode 5.

In this example, the power supply circuit 21 supplied 30 V as the selection voltage, −10 V as the non-selection voltage, and 0 V for 0 V output, to the scanning line driver 14, and supplied 10 V as the on-state voltage, −10 V as the off-state voltage and 0 V for 0 V output. Further, the power supply circuit 21 supplies 10 V and 0 V as reference voltages, of the D/A converter 204, for generating the collecting voltage, and −10 V as the non-collectable voltage, to the third electrode driver 20. The circuit 21 supplied 3.3 V as a power for driving the shift registers and the latch circuits, and 0 V to the second electrode 5.

Figure 22:
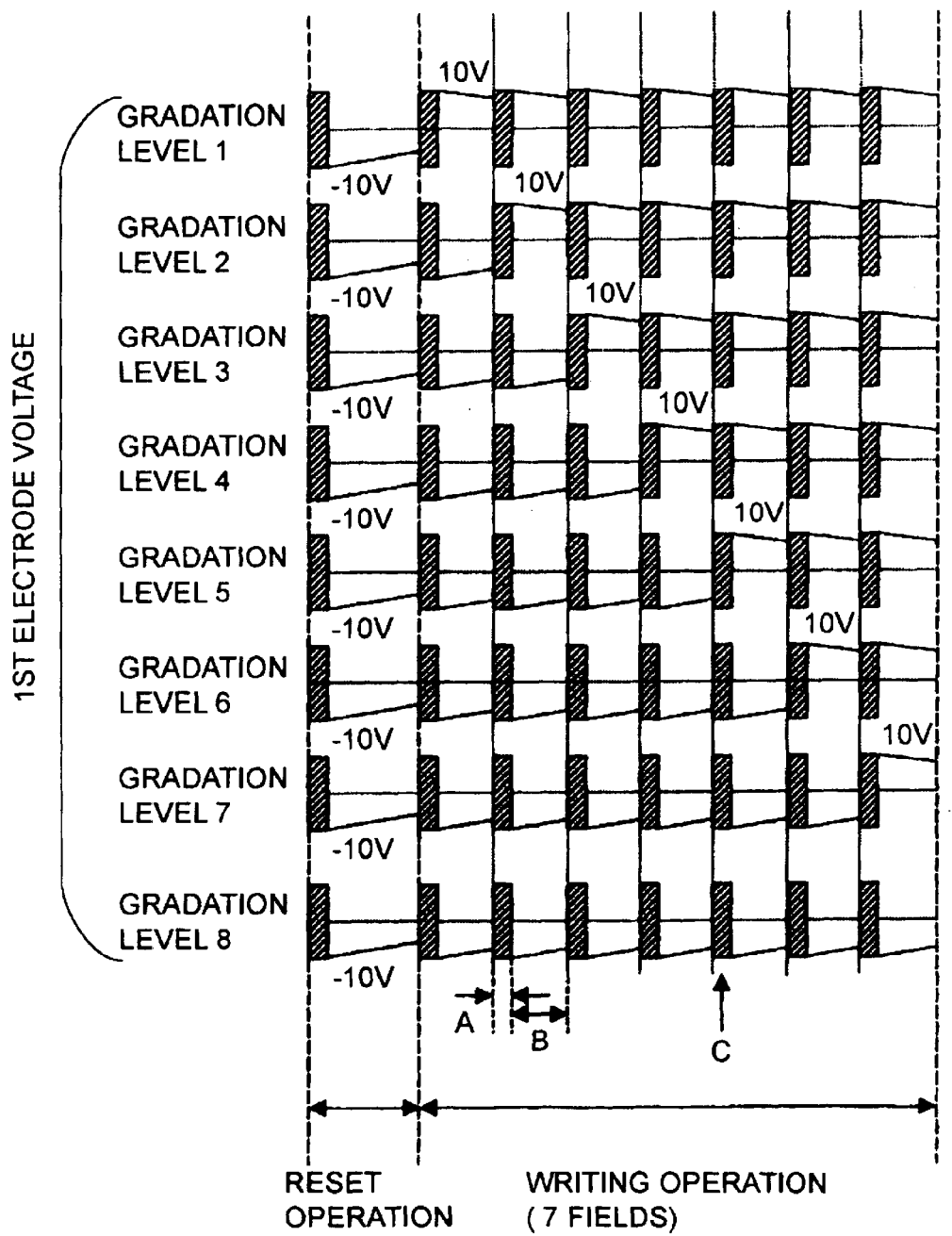
FIG. 22 is a view for illustrating a voltage application state at the time of reset operation and writing operation.

The electrophoretic display of this example was driven by the driving method according to the present invention. FIG. 22 is a view for explaining voltage application states at the time of reset and writing operations.

In this example, display with 8 gradation levels is effected in one writing period divided into 7 fields. The voltage of the scanning electrode 5 is 0 V. First of all, as a reset operation, all the outputs from the scanning line driver 14 are set to the selection voltage and all the outputs from the data line driver 15 are set to the non-collectable voltage, whereby at all the pixels, the off-state voltage of −10 V is applied to the first electrodes 4 and the non-collectable voltage of −10 V is applied to the third electrode 6 <1> to the third electrode 6 <1200 >, thus collecting the electrophoretic particles 3 to the scanning electrode 5. As a result, a white display state is realized. At this time, to the scanning line driver 14, the reset signal <1> (RST1) is inputted at high level, and the 0 V-output signal <1> (ZERO1) and the maintaining signal (ME) are inputted at low level. To the data line driver 15, the reset signal <2> (RST2) is inputted at high level, and the 0 V-output signal <2> (ZERO2) is inputted at high level, and the 0 V-output signal <2> (ZERO2) is inputted at low level. To the third electrode driver 20, the reset signal <3> (RST3) is inputted at high level. Further, the voltage control signal (CNV) is inputted so as to provide 1 V to the output of the D/A converter 204 of the third electrode driver 20.

Figure 19:
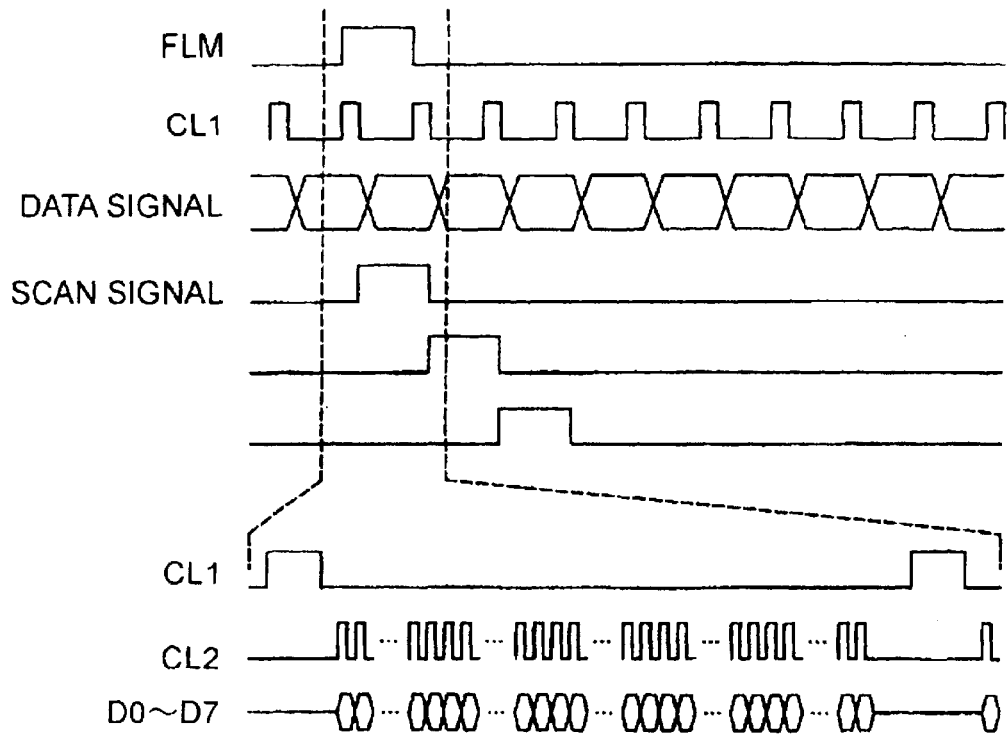
FIG. 19 is an operation time chart.

Next, the writing operation is performed. In order to realize gradation level 1 to gradation level 8 every pixel, to the first electrode 4 at each pixel, voltages are applied field by field as shown in FIG. 22. The operations of the scanning line driver 14 and the data line driver 15 are shown in FIG. 19. In this instance, to the scanning line driver 14, the reset signal <1> (RST1), the 0 V-output signal <1>(ZERO1) and the maintaining signal (ME) are inputted at low level. To the data line driver 15, the reset signal <2> (RST2) and the 0 V-output signal <2> (ZERO2) are inputted at low level. Further to the third electrode driver 20, the reset signal <3> (RST3) is inputted at low level. The resultant gradation level is determined in a field wherein the voltage of the first electrode 4 is switched from the off-state voltage of −10 V to the on-state voltage of 10 V. At that time, the electrophoretic particles 3 are moved toward the first electrode 4. In one field rewriting period A, selection is performed successively from the 1st scanning line to the 1200th scanning line on the basis of output from the scanning line driver 14, whereby the voltage is applied to the first electrode 4 and the auxiliary capacitor 11 and the auxiliary capacitor 11 is electrically charged. In this example, in a rewriting period C in the 5th field, in accordance with the method described with reference to FIGS. 9(b) to 9(f), when a certain scanning line 12 is in a selection period in synchronism with a timing of successive selection of the respective scanning lines 12, the voltage of the third electrode 6 connected with the certain scanning line 12 is switched from −10 V to 10 V.

Thereafter, to the scanning line driver 14, the maintaining signal (ME) is inputted at high level, and the reset signal <1> (RST1) and the 0 V-output signal <1> (ZERO1) are inputted at low level. Further, to the data line driver 15, the 0 V-output signal <2> (ZERO2) is inputted at high level and the reset signal <2> (RST2) is inputted at low level. As a result, the non-selection voltage of −10 V is supplied from all the outputs of the scanning line driver 14, and 0 (zero) V is supplied from all the outputs of the data line driver 15. At that time, the voltage of the first electrode 4 is gradually decreased from 10 V to 0 V with discharge of the electric charges stored in the auxiliary capacitor 11 through off resistance of the TFT (switching device 10). In synchronism with this voltage decrease, the output from the D/A converter 204 in the third electrode driver 20 is gradually decreased from 10 V to 0 V by the voltage control signal (CNV), whereby the collecting voltage outputted from the third electrode driver 20 is also gradually decreased from 10 V to 0 V. As a result, the voltages of all the electrodes at each pixel is finally decreased to 0 V, thus creating a non-electric field state to realize a display holding state. The reason shy all the outputs from the scanning line driver 14 are set to 0 V is as follows. In the process of creating the non-electric field within each pixel, when the scanning lines 12 are sequentially selected to apply 0 V to all the first electrode 4 or when 0 V is applied to all the first electrode 4 in a state that all the scanning lines 12 are selected, the first electrode 4 voltage is changed abruptly from 10 V to 0 V thereby to move the electrophoretic particles 3 due to an abrupt change in internal electric field and an occurrence of counter electric field. For this reason, all the switching devices 10 are turned off so as to gradually decrease the first electrode 4 voltage to 0 V. After the non-electric field state is created, all the outputs from the scanning line driver 14 are made 0 V by inputting the 0 V-output signal <1> (ZERO1) at high level, the reset signal <1> (RST1) at low level, and the maintaining signal (ME) at low level, into the scanning line driver 14.

According to the above described driving method and the drive circuits therefor, it is possible to realize the display with 8 gradation levels. As a result, it becomes possible to realize a still image display with stable halftone.

Example 2

In this example, the electrophoretic display prepared in the same manner as in Example 1 is driven in the following manner.

Figure 23:
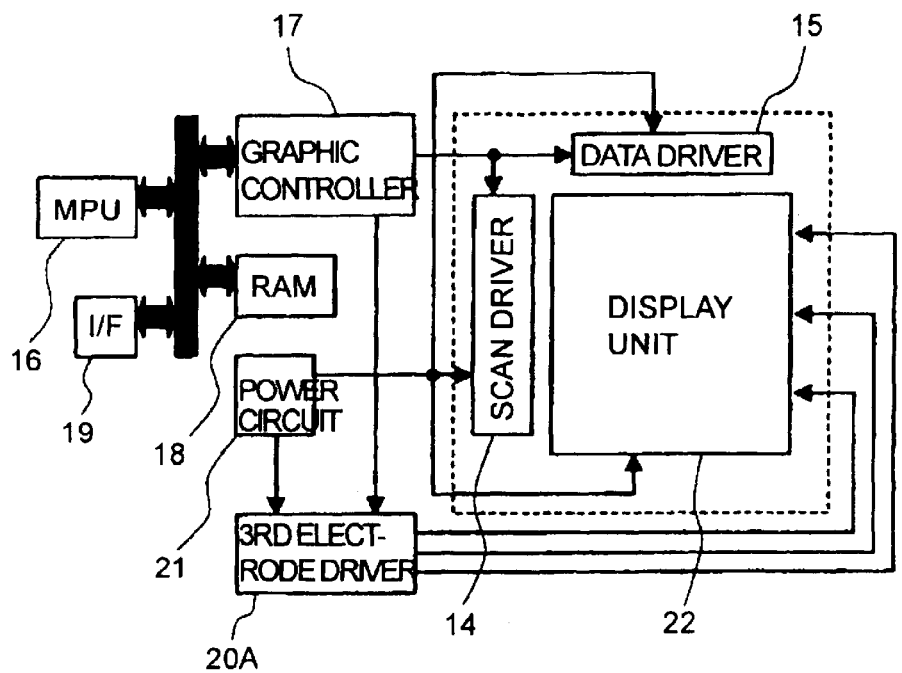
FIG. 23 is a block diagram showing another embodiment of a driving system of the electrophoretic display.
Figure 24:
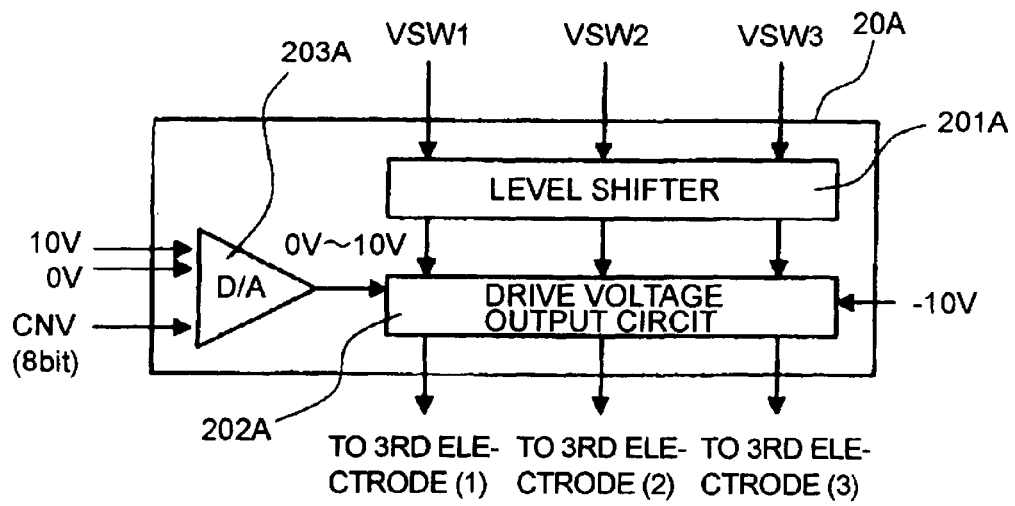
FIG. 24 is an internal block diagram of a third electrode driver.
Figure 25:
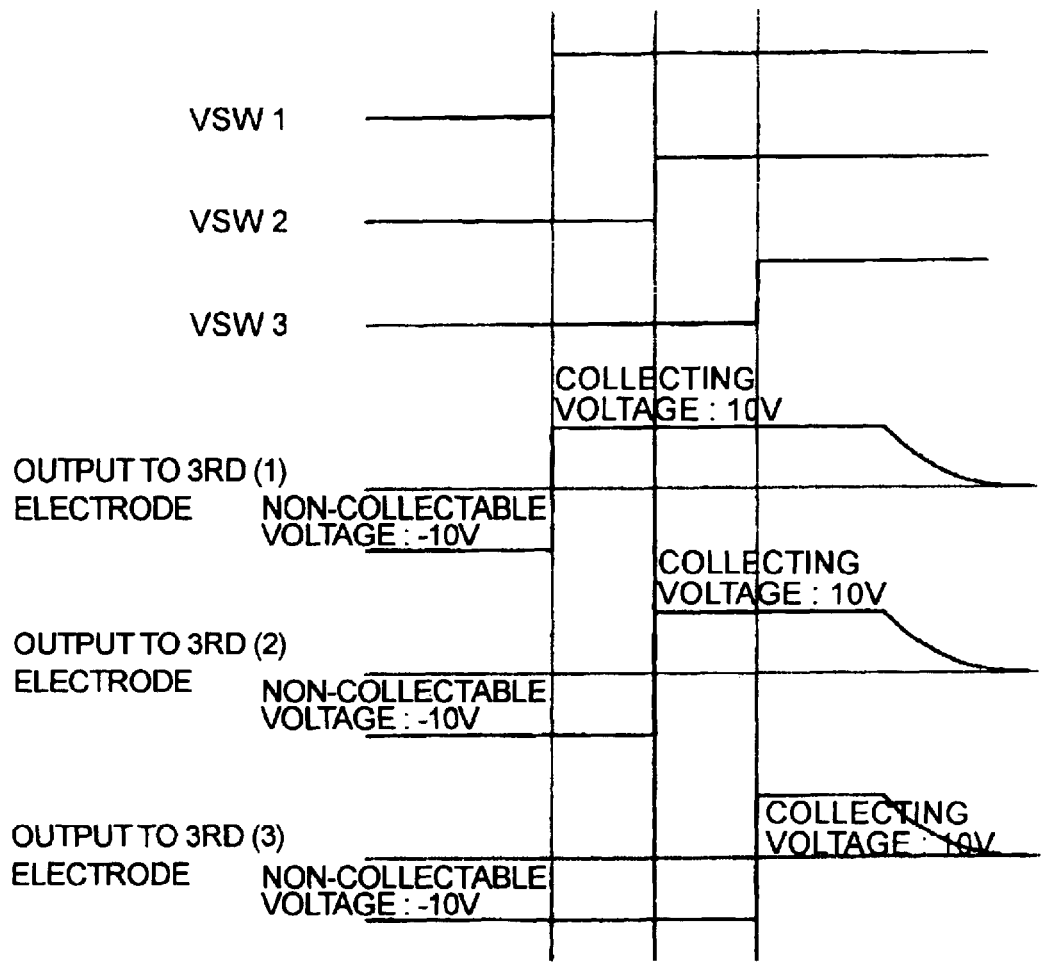
FIG. 25 is an operation time chart.

Image display is performed by using a drive system shown in FIG. 23, a third electrode driver 20A having an internal structure shown in FIG. 24 and an operation time chart shown in FIG. 25.

In this example, the third electrodes 6 are divided into a third electrode 6 <1> consisting of those connected with the 1st scanning line to the 400th scanning line integrally connected as one electrode, a third electrode 6 <2> consisting of those connected with the 401th scanning line to the 800th scanning line integrally connected as one electrode, and a third electrode <3> consisting of those connected with the 801th scanning line to the 1200th scanning line integrally connected as one electrode.

Interface signals includes a field synchronizing signal (FLM), a horizontal synchronizing signal (CL1), 8 bit data (D0 to D7), a data grabbing clock (CL2), a reset signal <1> (RST1), a reset signal <2> (RST2), 0 V-output signal <1> (ZERO1), V-output signal <2> (ZERO2), a maintaining signal (ME), a voltage switching signal <1> (VSW1), a voltage switching signal <2> (VSW2), and a voltage switching signal <3> (VSW3). These signals are transmitted to apply a drive voltage to the scanning lines 13 and the third electrodes 6 <1>, 6 <2> and 6 <3>, thus effecting display.

As shown in FIG. 24, the voltage switching signal <1> (VSW1) is converted into that at drive voltage level by a level shifter 201A and in a drive voltage output circuit 202A, a collecting voltage and a non-collectable voltage are selected by analog switch to be outputted to the third electrode 6 <1>. Similarly, the voltage switching signal <2> (VSW2) is converted into that at drive voltage level by a level shifter 201A and in a drive voltage output circuit 202A, a collecting voltage and a non-collectable voltage are selected by analog switch to be outputted to the third electrode 6 <2>.

Further, the voltage switching signal <3> (VSW3) is converted into that at drive voltage level by a level shifter 201A and in a drive voltage output circuit 202A, a collecting voltage and a non-collectable voltage are selected by analog switch to be outputted to the third electrode 6 <3>. The collecting voltage is supplied from a 8 bit D/A converter 203A and can be changed by a 8 bit voltage control signal (CNV) sent from the graphic controller 17. In the case where the collecting voltage is outputted from the third electrode driver 20A, in synchronism with a change in output from the D/A converter 203A, it is possible to change the output from the third electrode driver 20A. As shown in FIG. 25, in synchronism with the switching of the voltage switching signal <1> (VSW1) from the low level to the high level, the output to the third electrode 6 <1> is switched from the non-collectable voltage to the collecting voltage. Similarly, in synchronism with the switching of the voltage switching signal <2> (VSW2) from the low level to the high level, the output to the third electrode 6 <2> is switched from the non-collectable voltage to the collecting voltage. Further, in synchronism with the switching of the voltage switching signal <3> (VSW3) from the low level to the high level, the output to the third electrode 6 <3> is switched from the non-collectable voltage to the collecting voltage.

A power supply circuit 21 supplies the drive voltage for driving the display panel to the scanning line driver 14, the data line driver 15 and the third electrode driver 20A, and supplies a power for driving logic circuits, such as the shift register and the latch circuit, within each of the drivers. The power supply circuit 21 further supplies a voltage to the scanning electrode 5.

In this example, the power supply circuit 21 supplied 30 V as the selection voltage, −10 V as the non-selection voltage, and 0 V for 0 V output, to the scanning line driver 14, and supplied 10 V as the on-state voltage, −10 V as the off-state voltage and 0 V for 0 V output. Further, the power supply circuit 21 supplies 10 V and 0 V as reference voltages, of the D/A converter 204, for generating the collecting voltage, and −10 V as the non-collectable voltage, to the third electrode driver 20A. The circuit 21 supplied 3.3 V as a power for driving the shift registers and the latch circuits, and 0 V to the second electrode 5.

At the time of effecting the reset operation, to the scanning line driver 14, the reset signal <1> (RST1) is inputted at high level, and the 0 V-output signal <1> (ZERO1) and the maintaining signal (ME) are inputted at low level. To the data line driver 15, the reset signal <2> (RST2) is inputted at high level, and the 0 V-output signal <2> (ZERO2) is inputted at high level, and the 0 V-output signal <2>

(ZERO2) is inputted at low level. To the third electrode driver 20A, the voltage switching signals <1> (VSW1), <2> (VSW2), and <3> (VSW3) are inputted at low level. Further, the voltage control signal (CNV) is inputted so as to provide 1 V to the output of the D/A converter 203A of the third electrode driver 20A.

Voltage switching operation of the third electrode 6 is performed as shown in FIGS. 11(b) to 11(d) as described above.

Other driving manners are the same as in Example 1.

Example 3

In this example, the electrophoretic display is prepared in the same manner as in Example 1 except that at all the pixels, the second electrodes 5 and the third electrodes 6 are electrically connected in common with each other, respectively, is driven in the following manner.

Figure 26:
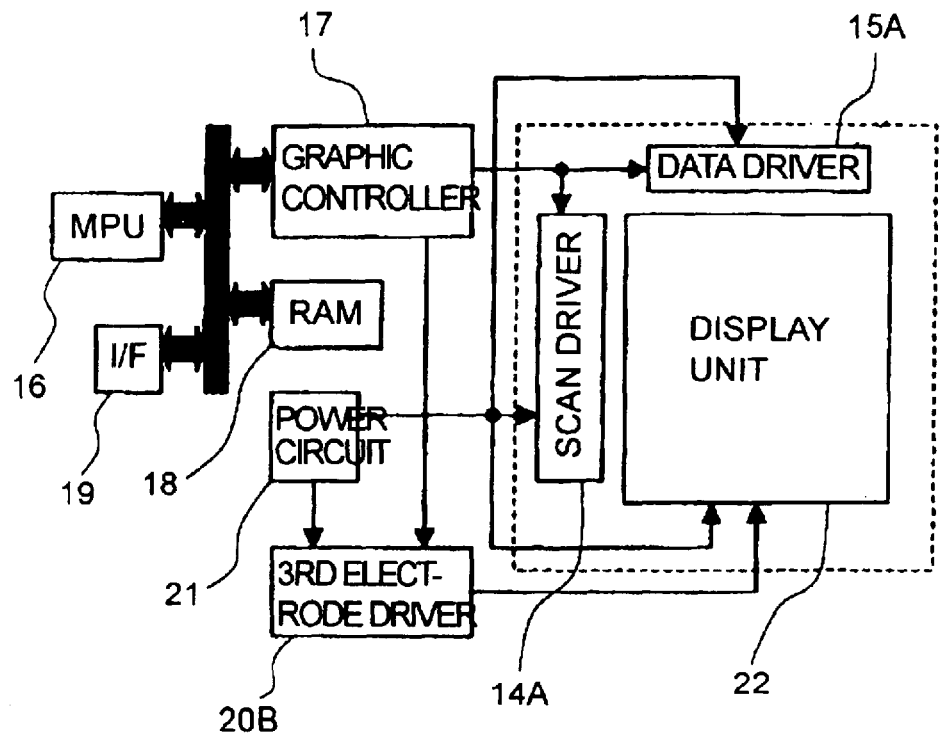
FIG. 26 is a block diagram showing another embodiment of a driving system of the electrophoretic display.
Figure 27:
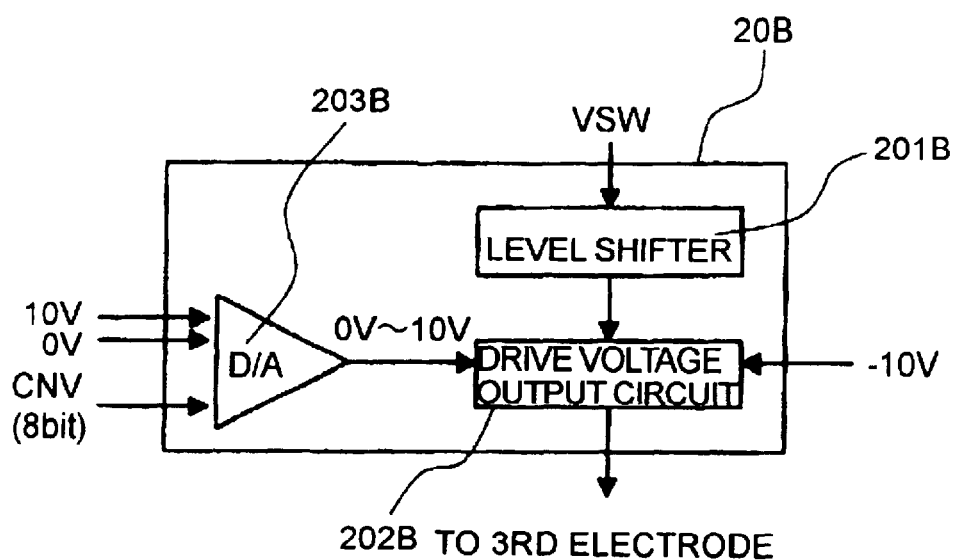
FIG. 27 is an internal block diagram of a third electrode driver.
Figure 28:
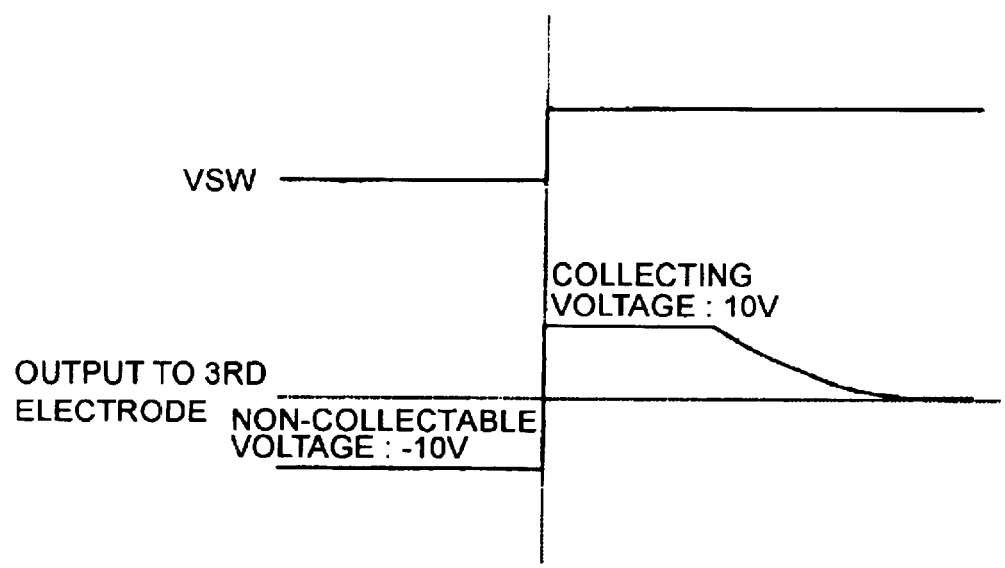
FIG. 28 is an operation time chart.

Image display is performed by using a drive system shown in FIG. 26, a third electrode driver 20B having an internal structure shown in FIG. 27 and an operation time chart shown in FIG. 28.

In the driving system shown in FIG. 26, the interface signals includes a field synchronizing signal (FLM), a horizontal synchronizing signal (CL1), 8 bit data (D0 to D7), a data grabbing clock (CL2), a reset signal <1> (RST1), a reset signal <2> (RST2), 0 V-output signal <1> (ZERO1), V-output signal <2> (ZERO2), a maintaining signal (ME), and a voltage switching signal (VSW). These signals are transmitted to apply a drive voltage to the scanning lines 13 and the third electrodes 6, thus effecting display.

Next, a scanning line driver 14A and a data line driver 15A are similar to those used in Example 1 except for their outputs. More specifically, the scanning line driver 14A has 400 output lines and includes therein a 400-stage shift register 141. Field synchronizing signal (FLM) data are grabbed at a falling edge of the horizontal synchronizing signal (CL1) and the successively shifted. The data line driver 15A has 600 outputs and outputs on-state voltage/off-state voltage to the data lines depending on display data.

At the time of a reset operation, all the outputs from the scanning line driver 14A are set to the selection voltage and all the outputs from the data line driver 15A are set to the non-collectable voltage, whereby at all the pixels, the off-state voltage of −10 V is applied to the first electrodes 4 and the non-collectable voltage of −10 V is applied to the third electrodes 6, thus collecting the electrophoretic particles 3 to the scanning electrode 5. As a result, a white display state is realized. At this time, to the scanning line driver 14A, the reset signal <1> (RST1) is inputted at high level, and the 0 V-output signal <1> (ZERO1) and the maintaining signal (ME) are inputted at low level. To the data line driver 15A, the reset signal <2> (RST2) is inputted at high level, and the 0 V-output signal <2> (ZERO2) is inputted at high level, and the 0 V-output signal <2> (ZERO2) is inputted at low level. To the third electrode driver 20B, the voltage switching signal (VSW) is inputted at low level. Further, the voltage control signal (CNV) is inputted so as to provide 1 V to the output of a D/A converter 203B of the third electrode driver 20B. In one field rewriting period A, selection is performed successively from the 1st scanning line to the 400th scanning line on the basis of output from the scanning line driver 14A, whereby the voltage is applied to the first electrode 4 and the auxiliary capacitor 11 and the auxiliary capacitor 11 is electrically charged.

Voltages switching operation of the third electrodes 6 is performed in the manner shown in FIG. 12 described above.

Thereafter, to the scanning line driver 14A, the maintaining signal (ME) is inputted at high level, and the reset signal <1> (RST1) and the 0 V-output signal <1> (ZERO1) are inputted at low level. Further, to the data line driver 15A, the 0 V-output signal <2> (ZERO2) is inputted at high level and the reset signal <2> (RST2) is inputted at low level. As a result, the non-selection voltage of −10 V is supplied from all the outputs of the scanning line driver 14A, and 0 (zero) V is supplied from all the outputs of the data line driver 15A. At that time, the voltage of the first electrode 4 is gradually decreased from 10 V to 0 V with discharge of the electric charges stored in the auxiliary capacitor 11 through off resistance of the TFT (switching device 10). In synchronism with this voltage decrease, the output from the D/A converter 203B in the third electrode driver 20B is gradually decreased from 10 V to 0 V by the voltage control signal (CNV), whereby the collecting voltage outputted from the third electrode driver 20 is also gradually decreased from 10 V to 0 V. As a result, the voltages of all the electrodes at each pixel is finally decreased to 0 V, thus creating a non-electric field state to realize a display holding state. The reason shy all the outputs from the scanning line driver 14A are set to 0 V is as follows. In the process of creating the non-electric field within each pixel, when the scanning lines 12 are sequentially selected to apply 0 V to all the first electrode 4 or when 0 V is applied to all the first electrode 4 in a state that all the scanning lines 12 are selected, the first electrode 4 voltage is changed abruptly from 10 V to 0 V thereby to move the electrophoretic particles 3 due to an abrupt change in internal electric field and an occurrence of counter electric field. For this reason, all the switching devices 10 are turned off so as to gradually decrease the first electrode 4 voltage to 0 V. After the non-electric field state is created, all the outputs from the scanning line driver 14A are made 0 V by inputting the 0 V-output signal <1> (ZERO1) at high level, the reset signal <1> (RST1) at low level, and the maintaining signal (ME) at low level, into the scanning line driver 14A.

Other driving manners are the same as in Example 1.

As described hereinabove, according to the present invention, the electrophoretic particles located in the vicinity of the first electrode are attracted toward the first electrode by switching the voltage applied to the first electrode so as to be readily visually identified, and the amount of movement of the electrophoretic particles toward the first electrode by switching the voltage applied to the third electrode to move the electrophoretic particles located in the vicinity of the second id electrode toward the third electrode is restricted.

However, by controlling a difference in voltage switching timing between the first electrode and the third electrode, a display gradation level at each pixel is controlled. In the case where the distance between the first electrode and the third electrode is set to be longer than the distance between the first electrode and the second electrode, the electrophoretic particles, which do not contribute to display operation, do not remain in the vicinity of the second electrode but are located (isolated) in a position apart from the first electrode (in the vicinity of the third electrode) after the electrophoretic particles 3 are moved to the first electrode 4 or the third electrode 6 as described above (e.g., in such a state that the still image is displayed over the entire display area of the electrophoretic display). For this reason, even if thereafter the voltage is continuously applied, it is possible to continuously display the still image with halftone without changing the amount of the electrophoretic particles distributed over the first electrode. As a result, it is possible to stably effect the halftone display. Further, even in the case of creating the non-electric field state within pixel, the electrophoretic particles, which do not contribute to the display, are isolated from those on the first electrode and located on the third electrode (other than the first electrode), so that the electrophoretic particles are not moved by the influence of a residual electric field created by electric charges remaining on the auxiliary capacitor at each pixel. As a result, a still image display with a stable halftone can be effected. Further, by decreasing the third electrode voltage simultaneously with reduction in residual electric field, it is possible to create the non-electric field state within each pixel without causing movement of the electrophoretic particles. As a result, it is possible to realize a still image display with a suppressed power-consumption. Further, the electrophoretic particles are moved along and in the vicinity of the constitutional members within each pixel and contact the constitutional members or mutually contact each other in the display holding state, so that it becomes possible to effect the still image display stably also with time.

What is claimed is:

1. An electrophoretic display, comprising:
   a display substrate and a rear substrate disposed with a predetermined spacing therebetween,
   an insulating liquid and a plurality of electrophoretic particles provided in the predetermined spacing,
   a first electrode disposed along said rear substrate for each pixel,
   a second electrode and a third electrode which are disposed at a boundary between adjacent pixels,
   voltage application means for applying voltages to said first to third electrodes, said voltage application means including reset means for collecting said electrophoretic particles at a peripheral portion of an associated pixel by applying a voltage for attracting said electrophoretic particles toward said second electrode, writing means for moving said electrophoretic particles collected by said reset means in a pixel area along said rear substrate by applying a voltage for attracting said electrophoretic particles toward said first electrode, and write limiting means for collecting a part of said electrophoretic particles at a peripheral portion of the associated pixel different from that with respect to said reset means by applying a voltage for attracting said electrophoretic particles toward said third electrode, and
   control means for controlling a gradation level by adjusting timing of application of the voltage for attracting said electrophoretic particles toward said first electrode by said writing means and the voltage for attracting said electrophoretic particles toward said third electrode by said write limiting means.

2. An apparatus according to claim 1, wherein said apparatus further comprises a partition member disposed in the predetermined spacing at the boundary between adjacent pixels, said second electrode being disposed between said partition member and said rear substrate and said third electrode being disposed between said partition member and said display substrate.

3. An apparatus according to claim 1, wherein said apparatus further comprises scanning lines and data lines arranged in a matrix form and a plurality of switching devices, each of which is disposed at an associated pixel and connected to associated scanning and data lines and an associated first electrode, for placing the associated data line and the associated first electrode in a conducting state or a nonconducting state on the basis of a signal inputted from the associated scanning line, and wherein said second electrodes at all the pixels are electrically connected to each other, and said third electrodes are electrically connected in common for each scanning line.

4. An apparatus according to claim 3, wherein said third electrodes at all the pixels are electrically connected to each other in common.

5. An apparatus according to claim 3, wherein each first electrode is connected to an auxiliary capacitor.

6. A driving method of an electrophoretic display including a display substrate and a rear substrate disposed with a predetermined spacing therebetween, an insulating liquid and a plurality of electrophoretic particles provided in the predetermined spacing, a first electrode disposed along said rear substrate for each pixel, and a second electrode and a third electrode which are disposed at a boundary between adjacent pixels, said driving method comprising:
   a reset step for collecting said electrophoretic particles at a peripheral portion of an associated pixel by applying a voltage for attracting said electrophoretic particles toward said second electrode,
   a writing step for moving said electrophoretic particles collected by said reset means in a pixel area along said rear substrate by applying a voltage for attracting said electrophoretic particles toward said first electrode, and
   a write limiting step for collecting a part to of said electrophoretic particles at a peripheral portion of the associated pixel different from that with respect to said rest means by applying a voltage for attracting said electrophoretic particles toward said third electrode, and
   wherein a gradation level is controlled by adjusting timing of application of the voltage for attracting said electrophoretic particles toward said first electrode by said writing step and the voltage for attracting said electrophoretic particles toward said third electrode by said write limiting step.

7. A method according to claim 6, wherein said electrophoretic apparatus further comprises scanning lines and data lines arranged in a matrix form and a plurality of switching devices, each of which is disposed at an associated pixel and connected to associated scanning and data lines and an associated first electrode, for placing the associated data line and the associated first electrode in a conducting state or a nonconducting state on the basis of a signal inputted from the associated scanning line, and
   wherein one display operation is performed in a plurality of fields after said reset step, and a sum of the number of fields in which only said writing step is performed and the number of fields in which both said writing step and said writing limiting step are performed, is changed depending on a display gradation level.

8. A method according to claim 7, wherein voltage switching timing for said third electrode is such that voltage switching is performed at the same time with respect to pixels along the same scanning line and successively performed for each scanning line.

9. A method according to claim 7, wherein voltage switching timing for said third electrode is identical to timing for selecting the scanning lines successively.

10. A method according to claim 7, wherein voltage switching timing for said third electrode is different for each scanning line.

11. A method according to claim 7, wherein voltage switching timing for said third electrode is identical at all the pixels.

12. A method according to claim 7, wherein each switching device is placed in the nonconducting state after a voltage switching for said third electrode is performed to gradually bring a voltage of said third electrode close to a voltage of said second electrode.

13. A method according to claim 7, wherein a time for effecting display in the plurality of fields in a time required to move all the electrophoretic particles located in the vicinity of said second electrode to said first electrode.

14. A method according to claim 7, wherein a time for effecting display in the plurality of fields is a sum of a time required to move all the electrophoretic particles located in the vicinity of said second electrode to said first electrode and a time required to move all the electrophoretic particles in the vicinity of said second electrode to said third electrode.

15. A method according to claim 6, wherein voltage switching for said third electrode is performed after voltage switching for said first electrode.

* * * * *